United States Patent
Hassibi et al.

(10) Patent No.: US 6,801,579 B1
(45) Date of Patent: Oct. 5, 2004

(54) METHOD AND WIRELESS COMMUNICATION USING UNITARY SPACE-TIME SIGNAL CONSTELLATIONS

(75) Inventors: Babak Hassibi, Somerset, NJ (US); Bertrand M Hochwald, Summit, NJ (US); Mohammad Amin Shokrollahi, Hoboken, NJ (US); Wim Sweldens, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 851 days.

(21) Appl. No.: 09/643,459

(22) Filed: Aug. 22, 2000

Related U.S. Application Data

(60) Provisional application No. 60/188,137, filed on Mar. 9, 2000.

(51) Int. Cl.[7] ................................................. H04L 5/12
(52) U.S. Cl. ....................... 375/264; 375/347; 375/240; 375/260; 375/299; 375/259; 375/267; 375/246; 370/310; 370/334
(58) Field of Search ............................... 375/347, 240, 375/260, 299, 264, 259, 267, 246; 370/310, 334

(56) References Cited

U.S. PATENT DOCUMENTS 6,724,842 B1 * 4/2004 Hochwald et al. .......... 375/347

OTHER PUBLICATIONS

Hughes: "Differential space–time modulation", IEEE Wireless Communications and Networking Conference, Sep. 21–24, 1999, pp. 145–149, XP002170443, Piscataway, US, * section III A *.

Hochwald et al.: "Systematic Design of Unitary Space–Time Constellations", Bell Laboratories TEchnical Memorandum, Jan. 1999, XP002139631 * abstract *.

Hassibi B et al: "Multiple antennas and representation theory", Bell Laboratories Technical Memorandum, Mar. 2000 (Mar. 2000), p. 337 XP002170444 * the whole document *.

(List continued on next page.)

Primary Examiner—Stephen Chin
Assistant Examiner—Guillermo Munoz
(74) Attorney, Agent, or Firm—Martin A. Finston

(57) ABSTRACT

Disclosed is a method for wireless signal transmission of signals from an array of two or more antennas, in which each signal to be transmitted is selected from a constellation of unitary space-time signals. Each unitary space-time signal is a unitary matrix, in which each column represents a respective antenna, each row represents a respective time interval, and each element represents a complex amplitude to be transmitted by a given antenna during a given time interval. In specific embodiments of the invention, the matrices of the signal constellation form a non-Abelian group having a positive diversity product, or a coset of such a group. In other embodiments, the signal constellation is a subset of such a group, and its multiplicative closure forms a finite non-Abelian group having a positive diversity product. In still other embodiments, the signal constellation is an extension of any of the preceding types of constellations, formed by adding one or more further elements that do not belong to and are not derived from the group or group subset.

26 Claims, 7 Drawing Sheets

OTHER PUBLICATIONS

European Search Report dated Feb. 8, 2001 for application No. 00310080.7–1237.

Tarokh, V. et al., "Space–time codes for high data rate wireless communication: Performance criterion and code construction," *IEEE Trans. Info. Theory 44* 744–765 (1998).

Hughes, B.L., "Differential Spacetime Modulation," *Proc. IEEE Wireless Networking and Communications Conference*, vol. 1, pp. 145–149 (1999).

Hamkins, J. et al., "Asympotically dense spherical codes," *IEEE Trans. Info. Theory 43* pp. 1774–1798 (1997).

Conway, J.H. et al., *Sphere Packings, Lattices and Groups*, Springer Verlag (1988).

Devroye, L. *Lecture Notes on Bucket Algorithms*, Birkhauser, Boston, MA (1986).

Tarokh, V. et al., "A differential detection scheme for transmit diversity," to be published in *J. Sel. Area Comm.* (2000).

U.S. patent application Ser. No. 09/528,973, filed on Mar. 21, 2000.

U.S. patent application Ser. No. 09/356,387, filed on Jul. 16, 1999.

U.S. patent application Ser. No. 09/134,297, filed on Aug. 14, 1998.

U.S. patent application Ser. No. 09/206,843, filed on Dec. 7, 1998.

* cited by examiner

METHOD AND WIRELESS COMMUNICATION USING UNITARY SPACE-TIME SIGNAL CONSTELLATIONS

CROSS-REFERENCE TO RELATED APPLICATION

This application claims priority of Provisional Application Ser. No. 60/188137 which was filed Mar. 9, 2000.

FIELD OF THE INVENTION

This invention relates to modulation schemes for wireless communication. More particularly, the invention relates to the construction of signal constellations for use in unitary space-time modulation of wireless signals.

ART BACKGROUND

When wireless communication signals are in transit between a transmit antenna and a receive antenna, they are generally subject to destructive interference and other physical effects that vary in time. As a consequence, the received signal arrives with an attenuation and phase delay that will also generally vary in time. This effect is referred to as fading. Where, e.g., attention is confined to a sufficiently narrow bandwidth, the attenuation and phase delay of the received signal can be described by a complex-valued coefficient h often referred to as the fading coefficient.

Practitioners in the field of wireless communications have recognized that by using multiple antennas for transmission, reception, or both, it is possible to mitigate some of the undesirable consequences of fading, and to achieve certain other benefits as well. For example, the use of multiple antennas affords alternate transmission paths, some of which may, at a given time, be less subject to fading than others. The use of multiple antennas also provides a mechanism for sending redundant signals, the better to understand them at the receiving end, even in the face of severe fading. Even if redundancy is not a primary objective, the use of multiple antennas can provide a mechanism for increasing total transmission rates in a given frequency channel, by simultaneously transmitting multiple, independent signals that can be separated at the receiving end.

FIG. 1 is a simplified, schematic diagram of a wireless communication system having two transmit antennas 10, 15, and three receive antennas 20, 25, 30. As indicated at block 40, baseband-level signals generated at block 35 are modulated onto a carrier wave, which is shown symbolically in the figure as generated at oscillator 50.

It will be seen from the figure that each of the receive antennas receives transmission from, e.g., antenna 10. Provided there is sufficient spatial separation, exemplarily spatial separation, between the receive antennas, the transmitted signals will bear distinct fading effects when they are received. (In this regard, it should be noted that diversity of fading effects can in at least some cases also be achieved by using receive antennas that are selectively receptive to diverse polarizations of the incoming signal, even if the antennas are not substantially separated in space.) A separate fading coefficient $h_{mn}$ accounts for the fading effects, in the physical propagation channel, between each transmit antenna m and each of the receive antennas n. As shown in the figure, m=1 for antenna 10 and m=2 for antenna 15. Similarly, n=1 for antenna 20, n=2 for antenna 25, and n=3 for antenna 30. All six of the fading coefficients $h_{mn}$ are arranged in a matrix H, denoted by block 55 of the figure.

It will be clear from the foregoing that each receive antenna receives, during a given time interval, a total signal that is a weighted sum of the transmissions from the respective transmit antennas. The weight coefficients of that sum are the fading coefficients. The received signal is also typically corrupted by additive noise, which is not indicated in the figure. Because each of the receive antennas is typically receiving a different weighted sum of the transmitted signal, it is theoretically possible under certain conditions to recover the transmitted baseband-level signals by taking appropriate weighted combinations of the demodulated, received signals. One condition necessary for such recovery is that there must be at least as many receive antennas as there are transmit antennas. Another such condition is that the additive noise must not be excessive relative to the signal strength. (It should be noted in this regard that practical methods of signal recovery often imply indirect methods such as maximum-likelihood detection, which is described below.)

Turning again to FIG. 1, demodulation of the received signals is indicated at blocks 60–70. Signal recovery is indicated at block 75. The recovered signals are indicated at block 80.

A new kind of transmitted signal, referred to as a space-time signal has been shown to offer potential improvements in both fading performance and transmission rate. In space-time modulation, each signal that is sent is selected from a finite set, or constellation, of predetermined signal matrices. Thus, if there are a total of L such matrices, each individual matrix that is transmitted conveys $\log_2 L$ bits of information. Advantageously, the signal matrices are unitary. In a unitary matrix, the columns or rows (whichever are longer) are mutually orthogonal and have unit norm. The individual elements of a unitary matrix are complex numbers; i.e., numbers that are real, imaginary, or sums of real and imaginary components. When unitary matrices are used, the modulation method is referred to as unitary space-time modulation (USTM).

The method of transmitting space-time matrices will now be explained with reference to FIG. 1. A 2×2 space-time signal matrix is represented in block 35 as the matrix:

$$\begin{pmatrix} s_{11} & s_{12} \\ s_{21} & s_{22} \end{pmatrix}.$$

Each element of this matrix is a complex number. Such an element is exemplarily modulated onto the carrier wave by subjecting the carrier wave to a suitable pulse-shaping function of the corresponding complex amplitude and having a width appropriate to the length of a transmission time interval. Each such transmission time interval is referred to as a channel use. During the first channel use, element $s_{11}$ is transmitted by antenna 10 and element $s_{12}$ is transmitted by antenna 15. During the second channel use, element $s_{21}$ is transmitted by antenna 10, and element $s_{22}$ is transmitted by antenna 15. More generally, each row of a space-time matrix corresponds to a respective channel use, and each column corresponds to a respective transmit antenna. Thus, the entry in row p and column q is the complex amplitude transmitted during the p'th channel use by the q'th antenna. The length of a channel use is generally chosen to be no longer than a fading interval; i.e., a length of time over which the fading coefficients can be assumed constant.

At the receiving end, the transmitted signal matrix is recovered as the matrix $$\begin{pmatrix} \hat{s}_{11} & \hat{s}_{12} \\ \hat{s}_{21} & \hat{s}_{22} \end{pmatrix},$$

as indicated at block 80 of FIG. 1. There are various methods for recovering an estimate of the transmitted signal matrix, based on the received matrix. According to one such method, referred to as maximum likelihood (ML) detection, a likelihood score is computed for each candidate signal matrix that might have been transmitted, and that candidate which maximizes the likelihood score is identified as the transmitted matrix. Typically, the likelihood score is the probability of the raw, basebanded signal amplitudes that are received, given that the candidate matrix was transmitted.

When each signal matrix is transmitted as a matrix drawn from the signal constellation, the ML detector must typically be provided with values of the fading coefficients. Such values may, for example, be measured using appropriate pilot signals. However, there are alternative transmission techniques, referred to as unknown channel techniques, that do not require the ML detector to know the (approximate) fading coefficients, provided the fading coefficients do not change substantially over at least as many, typically at least twice as many, channel uses as there are transmit antennas. One class of unknown channel techniques is referred to as differential modulation. An example of differential modulation is described in greater detail below. Briefly, each signal to be transmitted is the product of the previously transmitted signal, times a new signal matrix selected from the signal constellation. In that case, a suitably adapted ML detector can take advantage of the commonality of fading effects between each signal and its predecessor to effectuate signal recovery without explicit knowledge of the fading coefficients.

One relatively early study of space-time signals based on trellis codes, for transmission over a known channel, is described in V. Tarokh, et al., "Space-time codes for high data rate wireless communication: Performance criterion and code construction," *IEEE Trans. Info. Theory* 44 (1998) 744–765.

Unitary space-time modulation, applicable to both known and unknown channels, is described, e.g., in the co-pending U.S. patent application Ser. No. 09/134,297, filed on Aug. 14, 1998 by B. M. Hochwald et al. under the title, "Wireless Transmission Method for Antenna Arrays, Having Improved Resistance to Fading," the co-pending U.S. patent application Ser. No. 09/206843, filed on Dec. 7, 1998 by B. Hochwald et al. under the title, "Wireless Transmission Method for Antenna Arrays Using Unitary Space-Time Signals," and the co-pending U.S. patent application Ser. No. 09/528973, filed on Mar. 21, 2000 by B. Hassibi et al. under the title, "Method of Wireless Communication Using Structured Unitary Space-Time Signal Constellations," all commonly assigned herewith.

To help make unknown-channel multiple-antenna communication practical, a differential multiple-antenna modulation scheme using differential unitary space-time signals has been proposed that is well-tailored for unknown continuously varying Rayleigh flat-fading channels. Differential unitary space-time signals are unitary matrix-valued signals that are a multiple-antenna generalization of the standard differential phase-shift keying (DPSK) signals commonly used with a single antenna over an unknown channel. Differential unitary space-time modulation schemes are described, e.g., in the co-pending U.S. patent application Ser. No. 09/356387, filed on Jul. 16, 1999 by B. Hochwald et al. under the title, "Method for Wireless Differential Communication Using Multiple Transmitter Antennas," commonly assigned herewith.

There remains a need for a principled approach to designing space-time signal constellations that will more fully achieve their theoretical benefits of high data rate and low error probability.

SUMMARY OF THE INVENTION

We have found such an approach. According to our new approach, signal constellations of unitary space-time matrices are constructed to have group properties under the operation of matrix multiplication. A set G is a group under a binary multiplication operation if it is closed under multiplication, satisfies the associative law, has an identity element, and contains a multiplicative inverse for each element.

As noted above, the matrix that is detected at the receiving end of the communication system bears the effects of fading and of additive noise. As a consequence, there is some likelihood of error, at the receiver, in ascribing a given received signal to a particular transmitted signal. One important feature of a space-time signal constellation is that each pair of signal matrices should differ so distinctly from each other that they are unlikely to be confused by the receiver even in the presence of fading and noise.

We have found that signal constellations derived from certain types of groups have a relatively high diversity product. The diversity product is a measure, discussed in more detail below, of how distinguishable the signals are after transmission over a fading channel. Thus, such signal constellations are particularly advantageous for use in space-time modulation.

In one broad aspect, our invention involves a method for wireless signal transmission of signals, in which each signal to be transmitted is selected from a constellation of unitary space-time signals. In some embodiments of the invention, the signal constellation forms a group. In other embodiments, the signal constellation does not contain every member of a group, but a group, referred to as a multiplicative closure, is formed by the set of all possible products of the members of the signal constellation. In still other embodiments, the signal constellation is derived from a group or from a subset of the group by multiplying each member of the group or group subset by a common element, which will typically be a unitary matrix. The resulting constellation is said to be a coset of the group or group subset. In still other embodiments, the signal constellation is an extension of any of the preceding types of constellations, formed by adding one or more further elements that do not belong to and are not derived from the group or group subset.

Significantly, the group in each of these cases is a non-Abelian group of matrices having a positive diversity product. A group is non-Abelian if it contains at least two elements A, B, for which AB≠BA.

In another aspect, our invention involves signal constellations that relate to sets which, although not groups themselves, are constructed according to extensions and generalizations of our rules for constructing group-based constellations.

DETAILED DESCRIPTION

Figure 1:
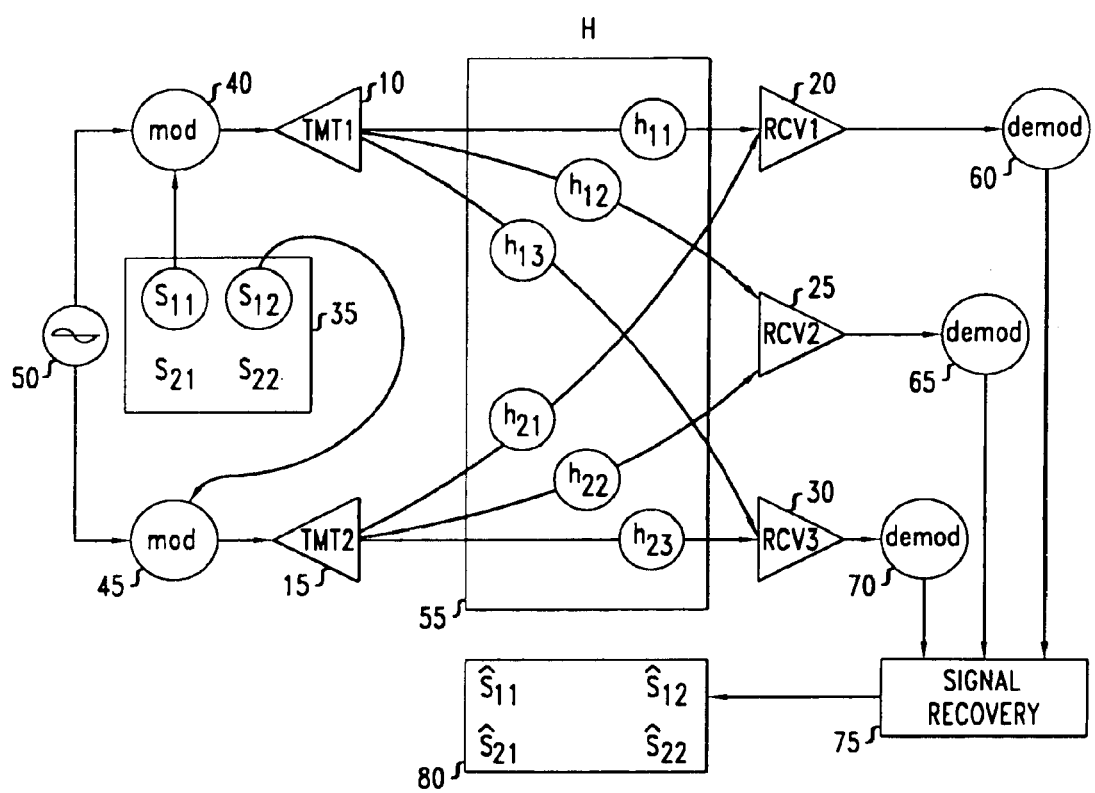
FIG. 1 is a schematic block diagram of a system for wireless communication using multiple-antenna arrays.

The design problem for unitary space time constellations is: let M be the number of transmitter antennas and R the desired transmission rate (in bits/channel use). Construct a set $v$ of $L=2^{RM}$ unitary M×M matrices such that for any two distinct elements A and B in $v$, the quantity $|\det(A-B)|$ is as large as possible. Any set $v$ such that $|\det(A-B)|>0$ for all distinct $A,B \in v$ is said to have full diversity.

The design problem can advantageously be simplified by imposing, a priori, an appropriate structure on the constellation set $v$. Here, we focus on sets $v$ of unitary matrices that form a mathematical group with respect to matrix multiplication. The use of a group structure offers certain advantages. The first, based on theoretical considerations, is that constellations having group structure are generally expected to have good potential performance.

The second advantage is based on practical considerations. Since in differential space-time modulation one multiplies matrices in $v$ to form the transmitted signal matrix, if $v$ is a group, every transmitted signal matrix is always an element of $v$. Therefore, explicit matrix multiplication is replaced by the simpler group table-lookup.

Some of the groups that emerge as good signal sets are rather surprising. We have found, for example, that if M is odd, there is only a single class of possible groups. If M=2 or M=4, some of the signal sets that are excellent performers involve $SL_2(F_5)$—the special linear group in two dimensions over the field $F_5$, i.e., over the field of integers modulo 5 with the binary operations of addition and multiplication. However, we also found that full-diversity non-Abelian groups do not necessarily exist for all M and R.

The Rayleigh Flat Fading Channel.

Consider a communication link with M transmitter antennas and N receiver antennas operating in a Rayleigh flat-fading environment. The nth receiver antenna responds to the symbol sent on the mth transmitter antenna through a statistically independent multiplicative complex-Gaussian fading coefficient $h_{mn}$. The received signal at the nth antenna is corrupted at time t by additive complex-Gaussian noise $w_m$ that is statistically independent among the receiver antennas and also independent from one symbol to the next. We assume that time is discrete, t=0,1, . . . .

It is convenient to group the symbols transmitted over the M antennas in blocks of M channel uses. We use $\tau=0,1, \ldots$ to index these blocks; within the $\tau$'th block, $t=\tau M, \ldots, \tau M+M-1$. The transmitted signal is written as an M×M matrix $S_\tau$ whose m'th column contains the symbols transmitted on the m'th antenna as a function of time; equivalently, the rows contain the symbols transmitted on the M antennas at any given time. The matrices are normalized so that the expected square Euclidean norm of each row is equal to one. Hence, the total transmitted power does not depend on the number of antennas. The fading coefficients $h_{mn}$ are assumed to be constant over these M channel uses.

Similarly, the received signals are organized in M×N matrices $X_\tau$. Since we have assumed that the fading coefficients are constant within the block of M symbols, the action of the channel is given by the simple matrix equation $$X_\tau' = \sqrt{\rho} S_\tau H_\tau + W_\tau \text{ for } \tau=0,1,\ldots$$

Here $H_\tau = \{h_{mn}\}$ and $W_\tau = \{w_m\}$ are M×N matrices of independent CN(0,1)-distributed random variables; i.e., variables complex-normal distributed with zero mean and unit variance. Because of the power normalization, $\rho$ is the expected SNR at each receiver antenna.

Known Channel Modulation.

We first discuss signal encoding and decoding when the receiver knows the channel $H_\tau$. We assume that the data to be transmitted is a sequence $z_0, z_1, \ldots$ with $z_\tau \in \{0, \ldots, L-1\}$. The data then simply dictate which matrix is transmitted:

$$S_\tau = V_{z_\tau}.$$

Each transmitted matrix occupies M time samples of the channel, implying that transmitting at a rate of R bits per channel use requires a constellation $v=\{V_1, \ldots, V_L\}$ of $L=2^{RM}$ unitary signal matrices.

The receiver knows $H_\tau$ and computes the maximum likelihood estimate of the transmitted data as $$\hat{z}_\tau = \arg\min_{l=0,\ldots,L-1} \|X_\tau - V_l H_\tau\|,$$

where the matrix norm is the Frobenius norm $$\|A\|^2 = tr(A^\dagger A).$$

The quality of a constellation ν is determined by the probability of error of mistaking one symbol of ν for another. The Chernoff bound on the pairwise probability of mistaking $V_l$ for $V_{l'}$ with a known channel (averaged over the statistics of H) is given by $$P_e \leq \frac{1}{2} \prod_{m=1}^{M} \left[1 + \frac{\rho}{4} \sigma_m^2(V_l - V_{l'})\right]^{-N},$$

where $\sigma_m (V_l - V_{l'})$ is the mth singular value of the M×M matrix $V_l - V_{l'}$.

Differential Unitary Space-time Modulation.

When the receiver does not know the channel, one can communicate using multiple-antenna differential modulation. Multiple-antenna differential modulation is formally similar to standard single-antenna differential phase-shift keying. In standard DPSK, the transmitted symbol has unit-modulus and is the product of the previously transmitted symbol and the current data symbol. The data symbol typically is one of L equally-spaced points on the complex unit circle. As a generalization, M-antenna differential unitary space-time modulation differentially encodes a M×M unitary matrix that is the product of the previously transmitted matrix and a unitary data matrix taken from the constellation. In other words, $$S_\tau = V_{z_\tau} S_{\tau-1}, \tau = 1, 2, \ldots,$$

with $S_0 = I_M$. We immediately see why it is useful in practice to have ν form a group under matrix multiplication: if ν is a group then all the transmitted matrices $S_\tau$ also belong to ν. Therefore, the transmitter sends matrices $S_\tau$ from a finite set and does not need to explicitly multiply $S_\tau = V_{z_\tau} S_{\tau-1}$, but rather can use a group table-lookup.

If the fading coefficients are approximately constant over 2M time samples ($H_\tau \approx H_{\tau-1}$), the received matrices turn out to obey $$X_\tau = V_{z_\tau} X_{\tau-1} + \sqrt{2} W'_\tau,$$

where $W'_\tau$ is a M×N matrix of additive CN (0,1) noise. A known maximum likelihood decoder has the simple structure $$\hat{z}_\tau = \arg \min_{l=0,\ldots,L-1} \|X_\tau - V_l H_{\tau-1}\|,$$

and the Chernoff bound on the pairwise probability of error with differential modulation on an unknown channel is $$P_e \leq \frac{1}{2} \prod_{m=1}^{M} \left[1 + \frac{\rho^2}{4(1 + 2\rho)} \sigma_m^2(V_l - V_{l'})\right]^{-N}.$$

At high signal-to-noise ratio (SNR), the bound on the pairwise probability of error, whether the channel is known or unknown, depends primarily on the product of the singular values, which is the modulus of the determinant of $V_l - V_{l'}$. In other words, for high SNR we may write $$P_e \leq \frac{1}{2} \left(\frac{\alpha}{\rho}\right)^{MN} \cdot \frac{1}{|\det(V_l - V_{l'})|^{2N}},$$

where α=4 when the channel is known and α=8 when the channel is unknown and used differentially. Therefore, we measure the quality of a constellation ν by its so-called diversity product $$\zeta_\nu = \frac{1}{2} \min_{0 \leq l \leq l' \leq L} |\det(V_l - V_{l'})|^{\frac{1}{M}}.$$

The scaling factor 1/2 guarantees that $0 \leq \zeta_\nu \leq 1$. The exponent 1/M essentially gives the geometric mean of the M singular values since the modulus of the determinant is the product of the singular values. Clearly, a constellation with larger $\zeta_\nu$ is superior. Any constellation with $\zeta_\nu > 0$ is said to have full diversity. When $\zeta_\nu > 0$ and the SNR is high, we note that no two transmitted signals can give the same received signal X, for any H. Here, we consider only full-diversity constellations and, in particular, we try to find constellations with diversity product $\zeta_\nu$ as large as possible.

Group Representations

We wish to find a set ν of L unitary matrices for which the diversity product $\zeta_\nu$ is as large as possible. In this section we constrain V to form a group under matrix multiplication. With the group requirement, the design problem becomes that of finding a group of L unitary M×M-matrices such that $$\zeta_\nu = \frac{1}{2} \min_{I_M \neq V \in V'} |\det(I_M - V)|^{\frac{1}{M}}$$

is as large as possible. (The matrix symbol $I_d$ denotes the d×d-identity matrix. We later omit the dimension d if it is clear from the context.)

Groups fall into many different classes distinguished, inter alia, by whether the binary multiplication operation is Abelian (i.e., commutative), and by regularities of various kinds that emerge in the group multiplication tables. One broad family of groups, encompassing groups of many different classes, is the family of non-Abelian fixed-point-free groups.

One important property of fixed-point-free groups is that any such group has at least one representation with full diversity. A representation is a mapping to a group of invertible matrices, such that the product of two elements of the represented group is mapped to the product of the two corresponding image matrices, and such that the identity element of the group is mapped to the identity matrix. It should be noted that any finite group, if it is not already expressed in terms of unitary matrices, has an equivalent representation in terms of unitary matrices.

A non-Abelian Class of Fixed-point-free Groups.

Let $$G_{m,r} = <\sigma, \tau | \sigma^m = 1, \tau^n = \sigma^t, \sigma^\tau = \sigma^r>,$$

where n is the order of r modulo m (i.e., n is the smallest positive integer such that $r^n \equiv 1 \mod m$), t=m/gcd(r−1, m), and we have gcd (n,t)=1. (We use the notation $\sigma^\tau$ for $\sigma, \tau \in G$ to mean the element $\tau \sigma \tau^{-1}$) The greatest common divisor of r−1 and m is denoted $r_0$. The group $G_{m,r}$ has order mn because it contains the subgroup (σ) of order m and index n (the term "index" refers to the number of cosets). $G_{m,r}$ is fixed-point-free if and only if all prime divisors of n divide gcd(r−1, m).

We here limit our attention to groups in which n is greater than 1. This limitation excludes those groups of the class $G_{m,r}$ that are cyclic, as well as those that are Abelian. (A fixed-point-free group is Abelian if and only if it is cyclic.)

We now present a few examples of the fixed-point-free groups $G_{m,r}$.

Example 1 (3 antennas). Let n=3 and take r=4 and m=21.

Then we have $r_0=3$, $t=7$, $gcd(n,t)=gcd(3,7)=1$, and all prime divisors of n (i.e., the prime 3) divide $r_0$. Hence, $G_{21,4}$ is a fixed-point-free group. If we set $\eta=e^{2\pi i/21}$, and $$A = \begin{pmatrix} \eta & 0 & 0 \\ 0 & \eta^4 & 0 \\ 0 & 0 & \eta^{16} \end{pmatrix}, B = \begin{pmatrix} 0 & 1 & 0 \\ 0 & 0 & 1 \\ \eta^7 & 0 & 0 \end{pmatrix},$$

then the 63 matrices $A^l B^k$, $l=0, \ldots, 20$, $k=0, 1, 2$, form the group $G_{21,4}$ under matrix multiplication, with the identifications $\sigma \equiv A$, $\tau \equiv B$. We have $\zeta_{G_{21,4}}=0.3851$. This 3-antenna, 63-element constellation is one element shy of having rate R=2.

Example 2 (9 antennas). Let n=9 and take r=4 and m=57. Then we have $r_0=3$ and $t=19$, $gcd(n,t)=1$, and all prime divisors of n divide $r_0$. Hence $G_{57,4}$ is fixed-point-free. If we set $\eta=e^{2\pi i/57}$, and $$A = \text{diag}(\eta, \eta^4, \eta^{16}, \eta^7, \eta^{28}, \eta^{55}, \eta^{49}, \eta^{25}, \eta^{43}),$$

$$B = \begin{pmatrix} 0 & I_8 \\ \eta^{19} & 0 \end{pmatrix},$$

where diag $(a_1, \ldots, a_n)$ denotes the diagonal matrix with diagonal entries $a_1, \ldots, a_n$, then the 513 matrices $A^l B^k$, where $l=0, \ldots, 56$, and $k=0, \ldots, 8$ form the group $G_{57,4}$ under matrix multiplication with the identification $\sigma \equiv A$, $\tau \equiv B$. We have $\zeta_{G_{57,4}}=0.361$. This 9-antenna, 513-element constellation exceeds rate 1 by one element.

Classification of Fixed-point-free Groups.

We have classified all fixed-point-free groups and computed all the irreducible fixed-point-free representations of these groups. As will be appreciated by those skilled in the art, a representation $\Delta(g)$ of a group G having elements g is reducible if for some invertible complex linear transformation T and some pair $\Delta_1(g)$, $\Delta_2(g)$ of lower-dimensional representations, the following is true for all $g \in G$:

$$T\Delta(g)T^{-1} = \begin{bmatrix} \Delta_1(g) & \underline{0} \\ \underline{0} & \Delta_2(g) \end{bmatrix}.$$

If a group representation is not reducible, it is said to be irreducible. (The symbol "$\underline{0}$" in the preceding expression represents a zero matrix of appropriate dimension.)

Our results are presented below.

The Group Types

One type of fixed-point-free groups is $G_{m,r}$ for some m and r, presented above. There are five more types. For the following discussion, we introduce the following convention: Given a pair of integers (m,r), we implicitly define n to be the order of r modulo m; we define $r_0=gcd(r-1, m)$; and $t=m/r_0$. We call the pair (m,r) admissible, if gcd (n,t)=1, and all prime divisors of n divide $r_0$.

The six group types are:
1. $G_{m,r}$ (Described above):

$$G_{m,r}=<\sigma,\tau|\sigma^m=1,\tau^n=\sigma^t,\sigma^\tau=\sigma^r>,$$

where (m,r) is admissible. The order of $G_{m,r}$ is L=mn. As noted above, we here limit our attention to those groups of type $G_{m,r}$ for which n is greater than 1.

2. $D_{m,r,l}$:

$$D_{m,r,l}=<\sigma,\tau,\gamma|\sigma^m=1,\tau^n=\sigma^t,\sigma^\tau=\sigma^r,\sigma^\gamma=\sigma^l,\tau^\gamma=\tau^{-1},\gamma^2=\tau^{nr_0/2}>,$$

where $nr_0$ is even, (m,r) is admissible, $l^2 \equiv 1 \mod m$, $l \equiv 1 \mod n$, and $l \equiv -1 \mod s$, where s is the highest power of 2 dividing mn. The order of $D_{m,r,l}$ is L=2 mn.

3. $E_{m,r}$:

$$E_{m,r}=<\sigma,\tau,\mu,\gamma|\sigma^m=1,\tau^n=\sigma^t,\sigma^\tau=\sigma^r,\mu^{\sigma^{m/t}}=\mu,\gamma^{\sigma^{m/t}}=\gamma,\mu^4=1,\mu^2=\gamma^2,\mu^\gamma=\mu^{-1},$$
$$\mu^\tau=\gamma,\gamma^\tau=\mu\gamma>,$$

where (m,r) is admissible, mn is odd, and $nr_0$ is divisible by 3. The order of $E_{m,r}$ is 8 mn.

4. $F_{m,r,l}$:

$$F_{m,r,l}=<\sigma,\tau,\mu,\gamma\nu|\sigma^m=1,\tau^n=\sigma^t,\sigma^\tau=\sigma^r,\mu^{\sigma^{m/t}}=\mu,\gamma^{\sigma^{m/t}}=\gamma,\mu^\tau=\gamma,\gamma^\tau=\mu\gamma,$$
$$\mu^4=1,\mu^2=\gamma^2,\mu^\gamma=\gamma^{-1},\nu^2=\mu^2,\sigma^\nu=\sigma^l,\tau^\nu=\tau^l,\mu^\nu=\gamma^{-1},\gamma^\nu=\mu^{-1}>,$$

where (m,r) is admissible, mn is odd, $r_0$ is divisible by 3, n is not divisible by 3, $l^2 \equiv 1 \mod m$, $l \equiv 1 \mod n$, and $l \equiv -1 \mod 3$. The order of $F_{m,r,l}$ is 16 mn.

5. $J_{m,r}$:

$$J_{m,r}=SL_2(F_5) \times G_{m,r},$$

where (m,r) is admissible, gcd(mn, 120)=1, and $SL_2(F_5)$ is the group of 2×2-matrices over $F_5$ with determinant 1. $SL5(F_5)$ has the generators and relations $$SL_2(F_5)=<\mu,\gamma|\mu^2=\gamma^3=(\mu\gamma)^5,\mu^4=1>.$$

The order Of $J_{m,r}$ is 120 mn.

6. $K_{m,r,l}$:

$$K_{m,r,l}=<J_{m,r},\nu>$$

with the relations $$\nu^2=\mu^2,\mu^\nu=<\mu\gamma)^7(\gamma\mu)^2\gamma(\gamma\mu)^2,\gamma^\nu=\gamma,\sigma^\nu=\sigma^l,\tau^\nu=\tau^l,$$

where $\mu$ and $\gamma$ are as in $J_{m,r}$, and where $l^2 \equiv 1 \mod m$, $l \equiv 1 \mod n$. The order of $K_{m,r,l}$ is 240 mn.

Representation Theorem.

We have mathematically proven the following relationships between the above classes of fixed-point-free groups and their irreducible unitary representations:

(1) $G_{m,r}$ for admissible (m,r) has an irreducible n-dimensional fixed-point-free representation given by $$\sigma \mapsto A = \begin{pmatrix} \xi & 0 & 0 & \ldots & 0 \\ 0 & \xi^r & 0 & \ldots & 0 \\ 0 & 0 & \xi & \ldots & 0 \\ \vdots & \vdots & \vdots & \ddots & \vdots \\ 0 & 0 & 0 & \ldots & \xi^{r^{n-1}} \end{pmatrix}, \tau \mapsto B = \begin{pmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ \xi^t & 0 & 0 & \ldots & 0 \end{pmatrix},$$

and $\xi=e^{2\pi i/m}$. The corresponding constellation is given by the matrices $A^s B^k$, $s=0, \ldots, m-1$, $k=0, \ldots, n-1$. We note here (and omit in the remaining descriptions) that, implicitly, in this representation the matrix A becomes a scalar and B becomes undefined when r=1 because $G_{m,1}$ is cyclic.

(2) $D_{m,r,l}$ with admissible (m,r) has an irreducible 2n-dimensional fixed-point-free representation given by $$\sigma \mapsto A = \begin{pmatrix} A_0 & 0 \\ 0 & A_0^l \end{pmatrix}, A_0 = \begin{pmatrix} \xi & 0 & 0 & \ldots & 0 \\ 0 & \xi^r & 0 & \ldots & 0 \\ 0 & 0 & \xi^{r^2} & \ldots & 0 \\ \vdots & \vdots & \vdots & \ddots & \vdots \\ 0 & 0 & 0 & \ldots & \xi^{r^{n-1}} \end{pmatrix},$$

$$\tau \mapsto B = \begin{pmatrix} B_0 & 0 \\ 0 & B_0^l \end{pmatrix}, B_0 = \begin{pmatrix} 0 & 1 & 0 & \dots & 0 \\ 0 & 0 & 1 & \dots & 0 \\ \vdots & \vdots & \vdots & \ddots & \vdots \\ 0 & 0 & 0 & \dots & 1 \\ \xi^t & 0 & 0 & \dots & 0 \end{pmatrix},$$

$$\eta \mapsto R = \begin{pmatrix} 0 & I_n \\ -I_n & 0 \end{pmatrix},$$

where $\xi = e^{2\pi i/m}$. The corresponding constellation is given by $A^s B^k R^j$, $s=0, \dots, m-1$, $k=0, \dots, n-1$, $j=0, 1$.

(3) $E_{m,r}$ for admissible (m,r) has an irreducible 2n-dimensional fixed-point-free representation given by $$\sigma \mapsto A_z = \begin{pmatrix} A_{0,z} & 0 & 0 & \dots & 0 \\ 0 & A_{0,z}^r & 0 & \dots & 0 \\ 0 & 0 & A_{0,z}^{r^2} & \dots & 0 \\ \vdots & \vdots & \vdots & \ddots & \vdots \\ 0 & 0 & 0 & \dots & A_{0,z}^{r^{n-1}} \end{pmatrix},$$

$$A_{0,z} = \frac{e^{10\pi i/8} e^{2\pi i z/m}}{\sqrt{2}} \begin{pmatrix} 1 & 1 \\ i & -i \end{pmatrix},$$

$$\tau \mapsto B_z = \begin{pmatrix} 0 & I_2 & 0 & \dots & 0 \\ 0 & 0 & I_2 & \dots & 0 \\ \vdots & \vdots & \vdots & \ddots & \vdots \\ 0 & 0 & 0 & \dots & I_2 \\ A_{0,z}^t & 0 & 0 & \dots & 0 \end{pmatrix},$$

$$\mu \mapsto P = \begin{pmatrix} F_0 & 0 & 0 & 0 & \dots & 0 \\ 0 & F_1 & 0 & 0 & \dots & 0 \\ 0 & 0 & F_2 & 0 & \dots & 0 \\ 0 & 0 & 0 & F_0 & \ddots & 0 \\ 0 & 0 & 0 & 0 & \dots & F_{((n-1)\bmod 3)} \end{pmatrix},$$

$$\gamma \mapsto Q = \begin{pmatrix} F_1 & 0 & 0 & 0 & \dots & 0 \\ 0 & F_2 & 0 & 0 & \dots & 0 \\ 0 & 0 & F_0 & 0 & \dots & 0 \\ 0 & 0 & 0 & F_1 & \dots & 0 \\ \vdots & \vdots & \vdots & \vdots & \ddots & \vdots \\ 0 & 0 & 0 & 0 & \dots & F_{(n \bmod 3)} \end{pmatrix},$$

$$F_0 = \begin{pmatrix} i & 0 \\ 0 & -i \end{pmatrix}, F_1 = \begin{pmatrix} 0 & 1 \\ -1 & 0 \end{pmatrix}, F_2 = \begin{pmatrix} 0 & i \\ i & 0 \end{pmatrix},$$

where z=1 if 9 divides m, and z=3 otherwise. The corresponding constellation is given by $A_z^s B_z^k P^j Q^p$, $s=0, \dots, m-1$, $k=0, \dots, n-1$, $j=0, \dots, 3$, $p=0,1$.

(4) If $n>1$ or $l \not\equiv 1 \mod (m/3)$, then $F_{m,r,l}$ with admissible (m,r) has an irreducible 4n-dimensional representation given by:

$$\sigma \mapsto A = \begin{pmatrix} A_z & 0 \\ 0 & A_z^l \end{pmatrix}, \tau \mapsto B = \begin{pmatrix} B_z & 0 \\ 0 & B_z^l \end{pmatrix},$$

$$\mu \mapsto P = \begin{pmatrix} P & 0 \\ 0 & Q^{-1} \end{pmatrix}, \gamma \mapsto Q = \begin{pmatrix} Q & 0 \\ 0 & P^{-1} \end{pmatrix},$$

$$\nu \mapsto R = \begin{pmatrix} 0 & I_{2n} \\ -I_{2n} & 0 \end{pmatrix},$$

where $A_z$, $B_z$, P, Q are the matrices defined for the group $E_{m,r}$, and z=1 if 9 divides m, and z=3 otherwise. If r=1 and $l \equiv 1 \mod (m/3)$, then $F_{m,1,l}$ has an irreducible 2-dimensional fixed-point-free representation given by $$\sigma \mapsto A = A_{0,3}, B = I_2, \mu \mapsto P = F_0, \gamma \mapsto Q = F_1, \nu \mapsto R = \frac{1}{\sqrt{2}} \begin{pmatrix} -i & 1 \\ -1 & i \end{pmatrix},$$

where $A_{0,3}$, $F_0$, and $F_1$ are the matrices defined for $E_{m,r}$. The corresponding constellation is given by $A^s B^k P^j Q^p R^q$, where $s=0, \dots, m-1$, $k=0, \dots, n-1$, $j=0, \dots, 3$, $p=0, 1$, $q=0, 1$.

(5) $J_{m,r}$ has an irreducible 2n-dimensional fixed-point-free representation given by $$\sigma \mapsto A = I_2 \otimes \begin{pmatrix} \xi & 0 & 0 & \dots & 0 \\ 0 & \xi^r & 0 & \dots & 0 \\ 0 & 0 & \xi^{r^2} & \dots & 0 \\ \vdots & \vdots & \vdots & \ddots & \vdots \\ 0 & 0 & 0 & \dots & \xi^{r^{n-1}} \end{pmatrix},$$

$$\tau \mapsto B = I_2 \otimes \begin{pmatrix} 0 & 1 & 0 & \dots & 0 \\ 0 & 0 & 1 & \dots & 0 \\ \vdots & \vdots & \vdots & \ddots & \vdots \\ 0 & 0 & 0 & \dots & 1 \\ \xi^t & 0 & 0 & \dots & 0 \end{pmatrix},$$

$$\mu \mapsto P = P_0 \otimes I_n, P_0 = \frac{1}{\sqrt{5}} \begin{pmatrix} \eta^2 - \eta^3 & \eta - \eta^4 \\ \eta - \eta^4 & \eta^3 - \eta^2 \end{pmatrix},$$

$$\gamma \mapsto Q = Q_0 \otimes I_n, Q_0 = \frac{1}{\sqrt{5}} \begin{pmatrix} \eta - \eta^2 & \eta^2 - 1 \\ 1 - \eta^3 & \eta^4 - \eta^3 \end{pmatrix},$$

where $\eta = e^{2\pi i/5}$, $\xi = e^{2\pi i/m}$, and $\otimes$ denotes Kronecker-product. The corresponding constellation consists of the matrices $A^s B^k (PQ)^j X$, $s=0, \dots, m-1$, $k=0, \dots, n-1$, $j=0, \dots, 9$, and X runs over the set $\{I_{2n}, P, Q, QP, QPQ, QPQP, QPQ^2, QPQPQ, QPQPQ^2, QPQPQ^2P, QPQPQ^2PQ, QPQPQ^2PQP\}$.

(6) $K_{m,r,l}$ has an irreducible 4n-dimensional fixed-point-free representation given by $$\sigma \mapsto A = \begin{pmatrix} A_0 & 0 \\ 0 & A_0^l \end{pmatrix}, A_0 = I_2 \otimes \begin{pmatrix} \xi & 0 & 0 & \dots & 0 \\ 0 & \xi^r & 0 & \dots & 0 \\ 0 & 0 & \xi^{r^2} & \dots & 0 \\ \vdots & \vdots & \vdots & \ddots & \vdots \\ 0 & 0 & 0 & \dots & \xi^{r^{n-1}} \end{pmatrix},$$

$$\tau \mapsto B = \begin{pmatrix} B_0 & 0 \\ 0 & B_0^l \end{pmatrix}, B_0 = I_2 \otimes \begin{pmatrix} 0 & 1 & 0 & \dots & 0 \\ 0 & 0 & 1 & \dots & 0 \\ \vdots & \vdots & \vdots & \ddots & \vdots \\ 0 & 0 & 0 & \dots & 1 \\ \xi^t & 0 & 0 & \dots & 0 \end{pmatrix},$$

-continued $$\mu \mapsto P = \begin{pmatrix} P_0 & 0 \\ 0 & \tilde{P}_0 \end{pmatrix} \otimes I_n,$$

$$P_0 = \frac{1}{\sqrt{5}} \begin{pmatrix} \eta^2 - \eta^3 & \eta - \eta^4 \\ \eta - \eta^4 & \eta^3 - \eta^2 \end{pmatrix}, \tilde{P}_0 = \begin{pmatrix} 0 & -1 \\ 1 & 0 \end{pmatrix},$$

$$\gamma \mapsto Q = \begin{pmatrix} Q_0 & 0 \\ 0 & Q_0 \end{pmatrix} \otimes I_n, Q_0 = \frac{1}{\sqrt{5}} \begin{pmatrix} \eta - \eta^2 & \eta^2 - 1 \\ 1 - \eta^3 & \eta^4 - \eta^3 \end{pmatrix},$$

$$\nu \mapsto R = \begin{pmatrix} 0 & I_{2n} \\ -I_{2n} & 0 \end{pmatrix},$$

where $\eta = e^{2\pi i/5}$, $\xi = e^{2\pi i/m}$, and $\otimes$ denotes Kronecker-product. The corresponding constellation is given by $A^s B^k (PQ)^j X R^p$, $s=0, \ldots, m-1$, $k=0, \ldots, n-1$, $j=0, \ldots, 9$, $p=0, 1$, and X runs over the set $\{I_{4n}, P, Q, QP, QPQ, QPQP, QPQ^2, QPQPQ, QPQPQ^2, QPQPQ^2P, QPQPQ^2PQ, QPQPQ^2PQP\}$.

The six types of fixed-point-free groups are summarized in Table 1. For each group G represented in the Table, L is the order of G (the size of the constellation) and M is the dimension of the representation of G (number of transmitter antennas).

TABLE 1

| Group Type | L | M | Comments |
|---|---|---|---|
| 1. $G_{m,r}$ | mn | n | |
| 2. $D_{m,r,l}$ | 2 mn | 2 n | |
| 3. $E_{m,r}$ | 8 mn | 2 n | |
| 4. $F_{m,r,l}$ | 16 mn | 4 n | if n > 1 or l ≠ 1 mod m/3 |
| $F_{m,l,l}$ | 16 mn | 2 | if l ≡ 1 mod m/3 |
| 5. $J_{m,r}$ | 120 mn | 2 n | |
| 6. $K_{m,r,l}$ | 240 mn | 4 n | |

Some Explicit Simple Constellations.

Simple examples of some of the classes of fixed-point-free groups are presented below. For reasons of simplicity, we will identify the groups with images of their fixed-point-free representations computed above, and list the group elements as matrices.

We start with groups that have an irreducible fixed-point-free representation for M=2 transmitter antennas.

1. The smallest example of a $G_{m,r}$ having a 2-dimensional irreducible fixed-point-free representation is $G_{6,-1}$. The corresponding constellation consists of the 12 matrices $A^s B^k$, $s=0, \ldots, 5$, $k=0, 1$, where $$A = \begin{pmatrix} \xi & 0 \\ 0 & \xi^{-1} \end{pmatrix}, B = \begin{pmatrix} 0 & 1 \\ -1 & 0 \end{pmatrix},$$

and $\xi = e^{2\pi i/6}$. Its rate is R=log (12)/2=1.79, and its diversity product is $\zeta_{G_{6,-1}} = 0.5$.

2. The smallest example of a $D_{m,r,l}$ having a 2-dimensional irreducible fixed-point-free representation is $D_{4,1,-1}$. The corresponding constellation consists of the 12 matrices $A^s B^k$, $s=0, \ldots, 5$, $k=0, 1$, where $$P = \begin{pmatrix} i & 0 \\ 0 & -i \end{pmatrix}, Q = \begin{pmatrix} 0 & 1 \\ -1 & 0 \end{pmatrix}.$$

We have $\zeta_{Q_2} = \sqrt{2}/2 \approx 0.7071$. It should be noted that $D_{4,1,-1}$ is a special case of the so-called quaternion groups $D_{2^n,1,-1}$, which were proposed for use in wireless communication in B. L. Hughes, "Differential Spacetime Modulation," *Proc. IEEE Wireless Networking and Communications Conference (WCNC)*, vol. 1, pp. 145–149 (New Orleans, September 1999).

3. The smallest example of a group $E_{m,l}$ is the group $E_{3,1}$ of order 24. This group is isomorphic to $SL_2(F_3)$, the group of two-dimensional matrices over $F_3$ with determinant 1. The constellation is given by the 24 matrices $A^s P^j Q^p$, where $s=0, 1, 2$, $j=0, \ldots, 3$, $p=0, 1$, and $$A = \frac{e^{10\pi i/8}}{\sqrt{2}} \begin{pmatrix} 1 & 1 \\ i & -1 \end{pmatrix}, P = \begin{pmatrix} i & 0 \\ 0 & -i \end{pmatrix}, Q = \begin{pmatrix} 0 & 1 \\ -1 & 0 \end{pmatrix}.$$

Its rate is R=2.29, and $\zeta_{E_{3,1}} = 0.5$.

4. The smallest example of a group $F_{m,1,l}$ is the group $F_{3,1,-1}$ which has 48 elements. It consists of the matrices $A^s P^j Q^p R^q$, where $s=0, 1, 2$, $j=0, \ldots, 3$, $p=0, 1$, $q=0, 1$, and A, P, Q are as above while $$R = \frac{1}{\sqrt{2}} \begin{pmatrix} -i & 1 \\ -1 & i \end{pmatrix}.$$

Because n=1, the matrix B does not appear. The constellation has rate R=2.79, and $\zeta F_{3,1,-1} = 2 - \sqrt{\sqrt{2}/2} \approx 0.3868$.

5. The smallest example of $J_{m,r}$ is $J_{1,1}$ which is isomorphic to $SL_2(F_5)$. This constellation has 120 elements given by the matrices $(PQ)^j X$, where $j=0, \ldots, 9$, X runs over the set $[I_2, P, Q, QP, QPQ, QPQP, QPQ^2, QPQPQ, QPQPQ^2, QPQPQ^2P, QPQPQ^2PQ, QPQPQ^2PQP\}$, and $$P = \frac{1}{\sqrt{5}} \begin{pmatrix} \eta^2 - \eta^3 & \eta - \eta^4 \\ \eta - \eta^4 & \eta^3 - \eta^2 \end{pmatrix}, Q = \frac{1}{\sqrt{5}} \begin{pmatrix} \eta - \eta^2 & \eta^2 - 1 \\ 1 - \eta^3 & \eta^4 - \eta^3 \end{pmatrix},$$

where $\eta = e^{2\pi i/5}$. It has rate R=3.45, and $\zeta_{SL_2(F_5)} = \frac{1}{2} \sqrt{(3-\sqrt{5})/2} \approx 0.3090$. This group performs especially well.

6. The simplest example of a fixed-point-free group with irreducible fixed-point-free representations for M=3 is the group $G_{21,4}$ described above.

7. The best example of a low-rate fixed-point-free group with an irreducible 4-dimensional fixed-point-free representation is $K_{1,1,-1}$. It has 240 elements, with rate $R = \log_2(24)/4 = 1.98$, and $\zeta_{K_{1,-1,-1}} = 0.5$. The elements of this constellation are given by $(PQ)^j X R^p$, where $j=0, \ldots, 9$, $p=0, 1$, X runs over the same set as in example (5), above, but with $$P = \frac{1}{\sqrt{5}} \begin{pmatrix} \eta^2 - \eta^3 & \eta - \eta^4 & 0 & 0 \\ \eta - \eta^4 & \eta^3 - \eta^2 & 0 & 0 \\ 0 & 0 & 0 & -\sqrt{5} \\ 0 & 0 & \sqrt{5} & 0 \end{pmatrix},$$

$$Q = \frac{1}{\sqrt{5}} \begin{pmatrix} \eta - \eta^2 & \eta^2 - 1 & 0 & 0 \\ 1 - \eta^3 & \eta^4 - \eta^3 & 0 & 0 \\ 0 & 0 & \eta - \eta^2 & \eta^2 - 1 \\ 0 & 0 & 1 - \eta^3 & \eta^4 - \eta^3 \end{pmatrix},$$

-continued $$R = \begin{pmatrix} 0 & 0 & 1 & 0 \\ 0 & 0 & 0 & 1 \\ -1 & 0 & 0 & 0 \\ 0 & -1 & 0 & 0 \end{pmatrix}.$$

Exemplary Constellations and Their Performance.

We will now discuss the performance of some of the constellations above. To evaluate the performance, we used the differential transmission framework described above.

Most of the constellations were computer-simulated with fading coefficients that were chosen randomly but held constant for two consecutive matrix-valued signals. In one exceptional case described below, the constellation was transmitted over a functional three-transmitter-antenna wireless channel. The resulting figures plot the block probability of decoding a matrix incorrectly, denoted $P_e$.

Figure 2:
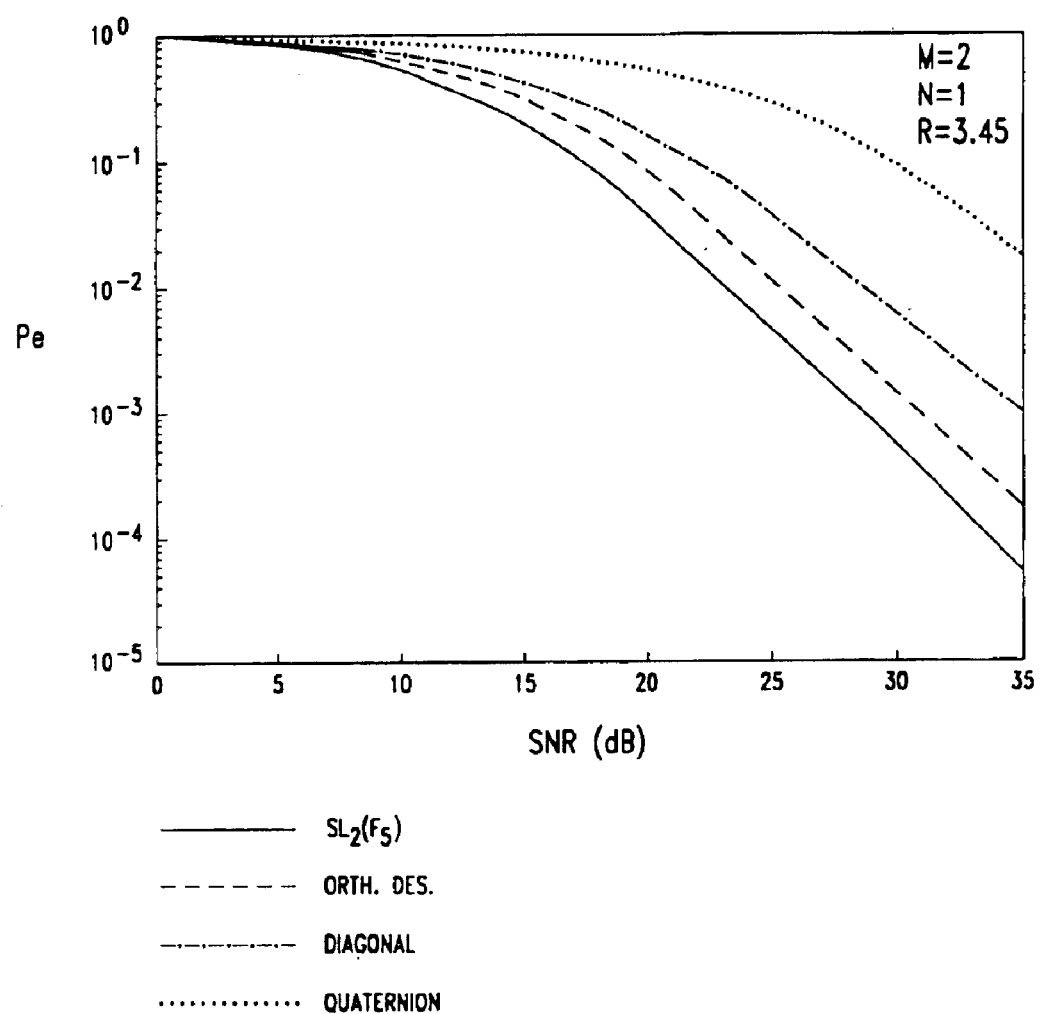
FIG. 2 is a graph of the theoretical block-error rate performance of a signal constellation based on the group $SL_2(F_5)$, in accordance with the invention in one embodiment. The antenna configuration consists of M=2 transmitter antenas and N=1 receiver antenna. Included in the figure, for comparison, are theoretical results for the same antenna configuration but in which the signal constellation is based on a non-group orthogonal construction (dashed line), the best diagonal construction, which was based on an Abelian group (dashed-dotted line), and a quaternion group (dotted line).

FIG. 2 displays the simulated performance of the group $SL_2(F_5)$ which has 120 elements, and therefore has a rate R log(120)/2=3.45. We also compare the best Abelian group we could find, a two-dimensional orthogonal design as described in V. Tarokh et al., "A differential detection scheme for transmit diversity," to be published in *J. Sel. Area Comm.* (2000), and the quaternion group $Q_6$, having L=128 matrices and rate R=3.5. The orthogonal design had 121 elements and was parametrized by a 2×2 matrix filled with $11^{th}$ roots of unity. The excellent performance of $SL_2(F_5)$ is evidenced by the aproximately 2.5 dB improvement over the orthogonal design (which is not a group), the 6.5 dB improvement over the Abelian group, and the 13 dB improvement over the quaternion group.

Figure 3:
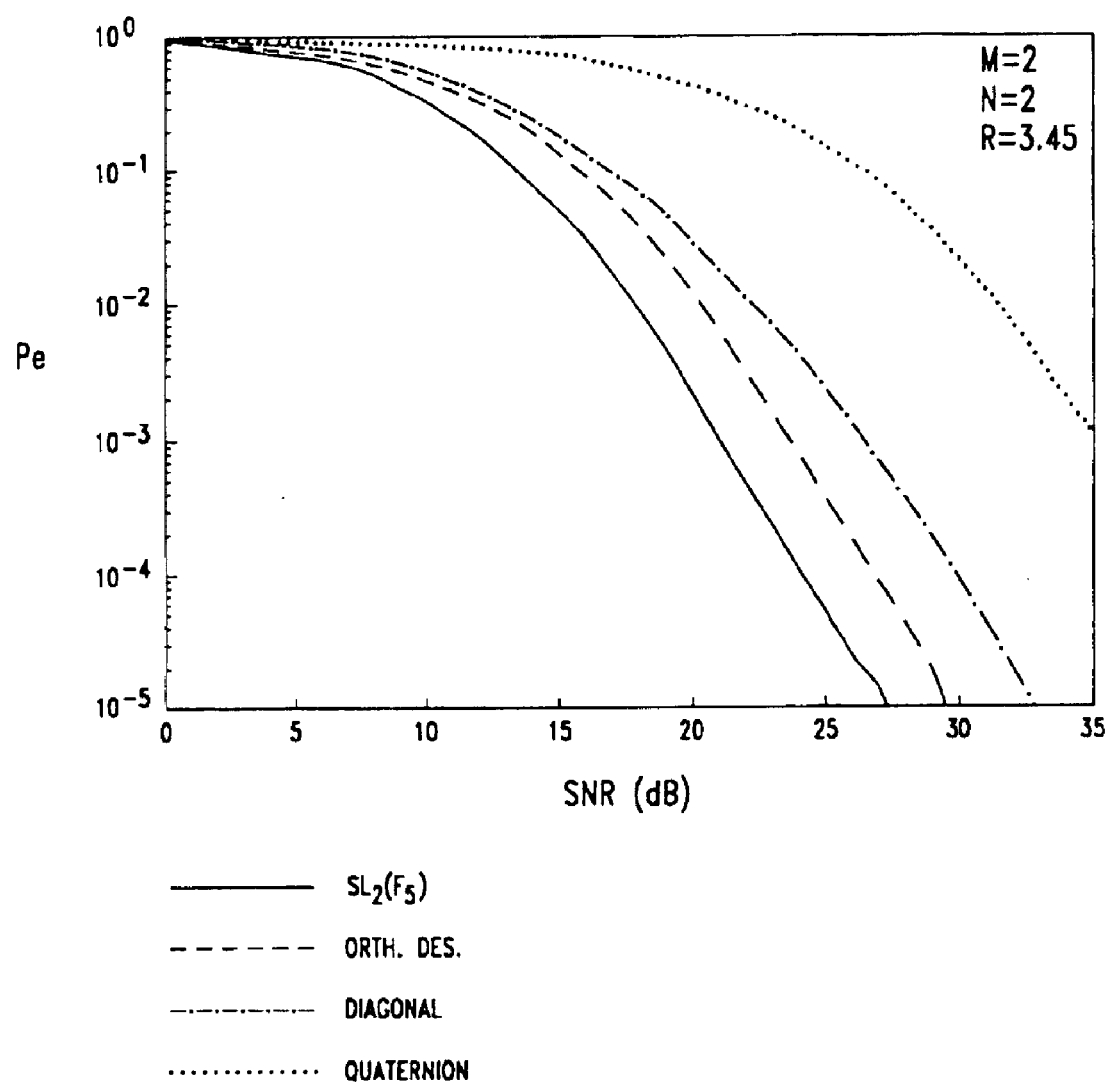
FIG. 3 is a graph of the theoretical block-error rate performances as in FIG. 2, but with N=2 receiver antennas. This figure suggests that the coding advantage of the group $SL_2(F_5)$ becomes more pronounced as the number of receiver antennas increases.
Figure 4:
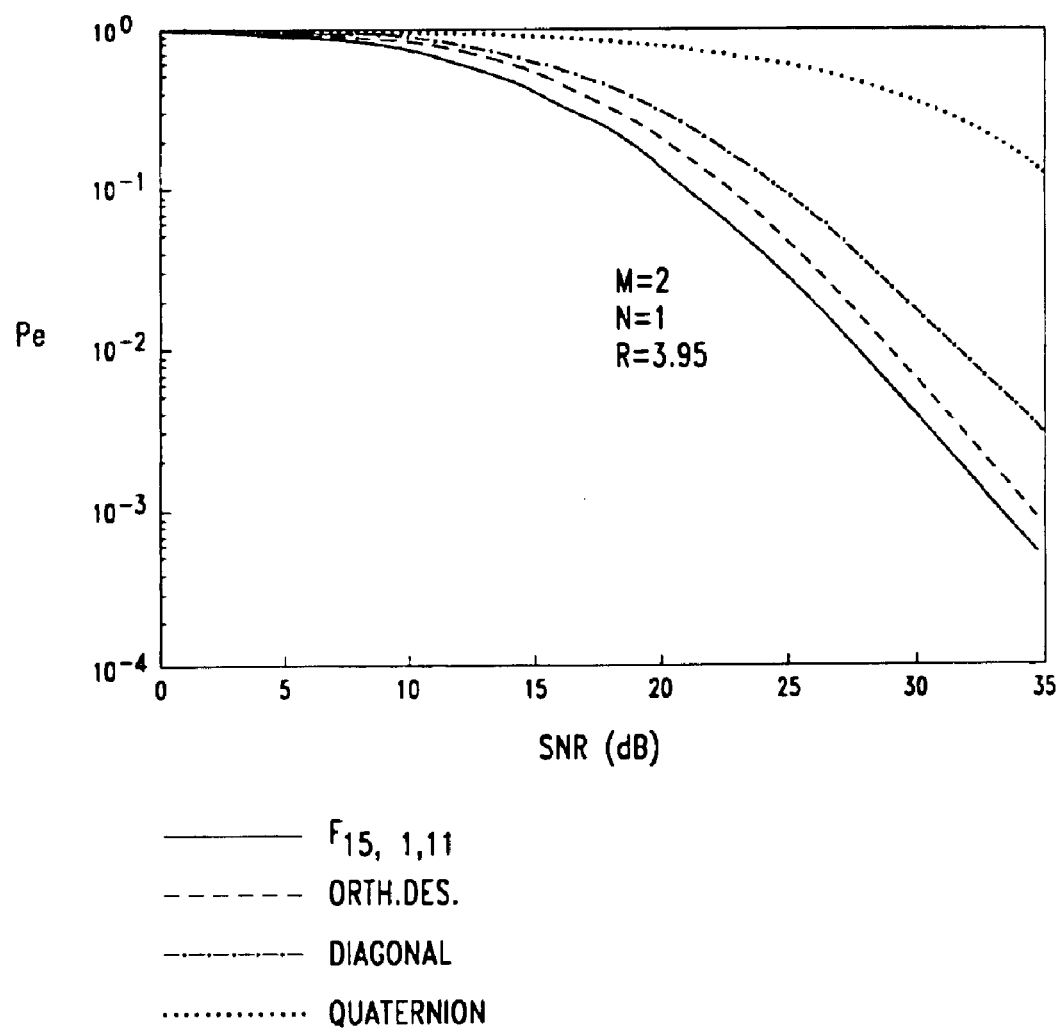
FIG. 4 is a graph of the theoretical block-error rate performance of a signal constellation based on the group $F_{15,1,11}$, in accordance with the invention in one embodiment. The antenna configuration consists of M=2 transmitter antennas and N=1 receiver antenna. The solid line represents $F_{15,1,11}$, which has L=240 unitary matrices (the rate R=3.95). The dashed line represents a non-group orthogonal design (R=4). The dashed-dotted line represents a diagonal (Abelian group) construction (R=3.95). The dotted line represents a quaternion group with L=256 matrices (R=4).

FIG. 3 is the same as FIG. 2 except that we now assume N=2 receive antennas. The relative merits of the various constellations are now more pronounced. The advantage in performance of the N=2 system compared to the N=1 system is also apparent. FIG. 4 provides a similar comparison to FIG. 2 except that we are now considering rate R≈4. The group constellation is $F_{15,1,11}$ with L=240 elements (R=3.95). The other constellations are the best orthogonal design, diagonal constellation and quaternion groups of comparable rate.

Figure 5:
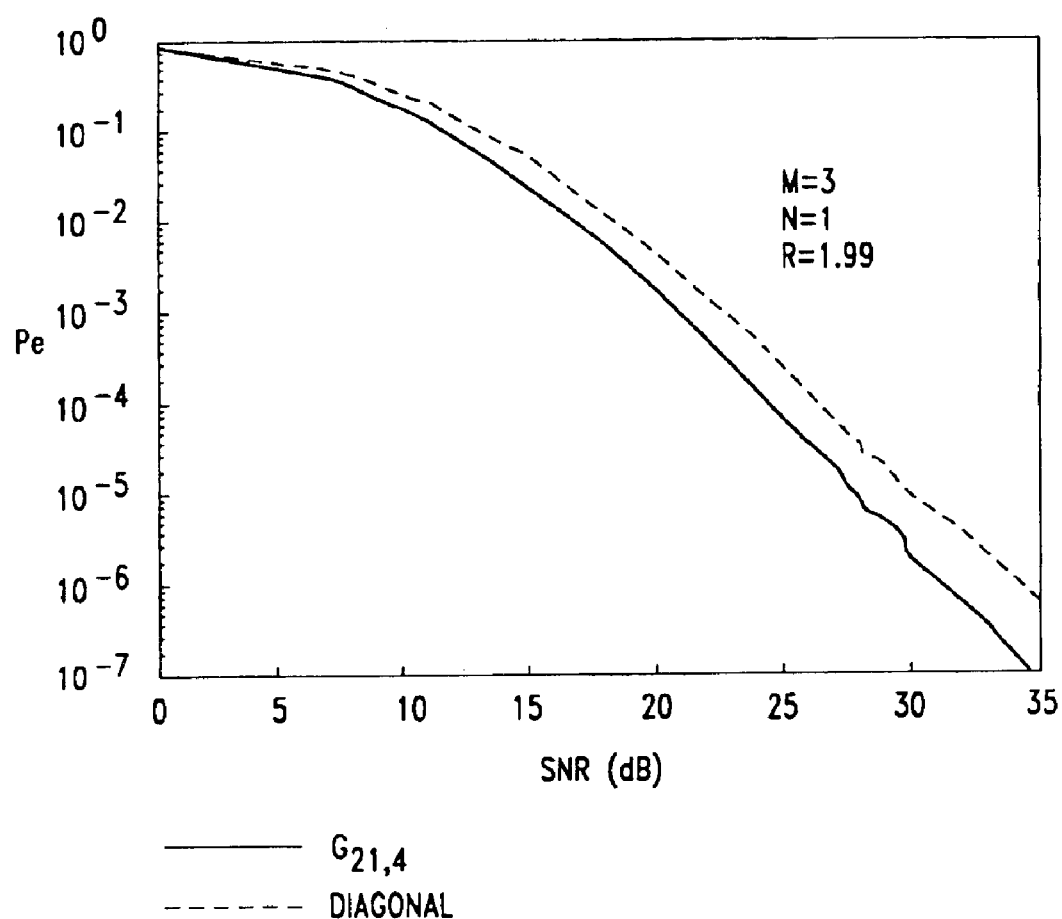
FIG. 5 is a graph of the theoretical block-error rate performance of a signal constellation based on the group $G_{21,4}$, which has an irreducible representation of L=63 matrices. The antenna configuration consists of M=3 transmitter antennas and N=1 receiver antenna (R=1.99). For comparison, we have also represented in the figure a diagonal (Abelian group) construction having the same rate R.
Figure 6:
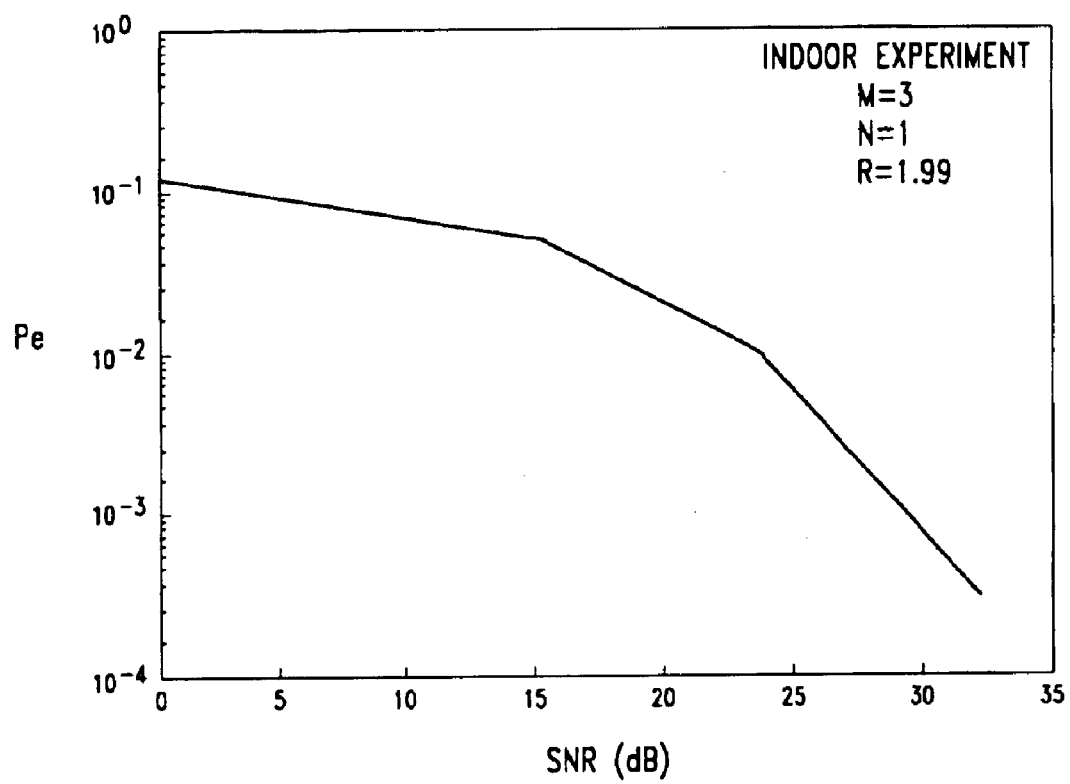
FIG. 6 is a graph of the experimentally measured block-error rate performance of a signal constellation based on the group $G_{21,4}$ (as in FIG. 5) transmitted over wireless apparatus in an indoor hallway of our research center.

FIG. 5 shows the performance advantage of the M=3 antenna, 63-element (R=1.99) group $G_{21,4}$ compared to the best three transmit antenna 63-element diagonal constellation. We were also able to transmit this constellation over a wireless apparatus located within a hallway at our research facility. The three transmit antennas were separated from the one receive antenna by approximately 10 meters around a bend in the hallway lined with metal walls and equipment, thus creating a rich quasi-static scattering environment. FIG. 6 shows the performance.

Figure 7:
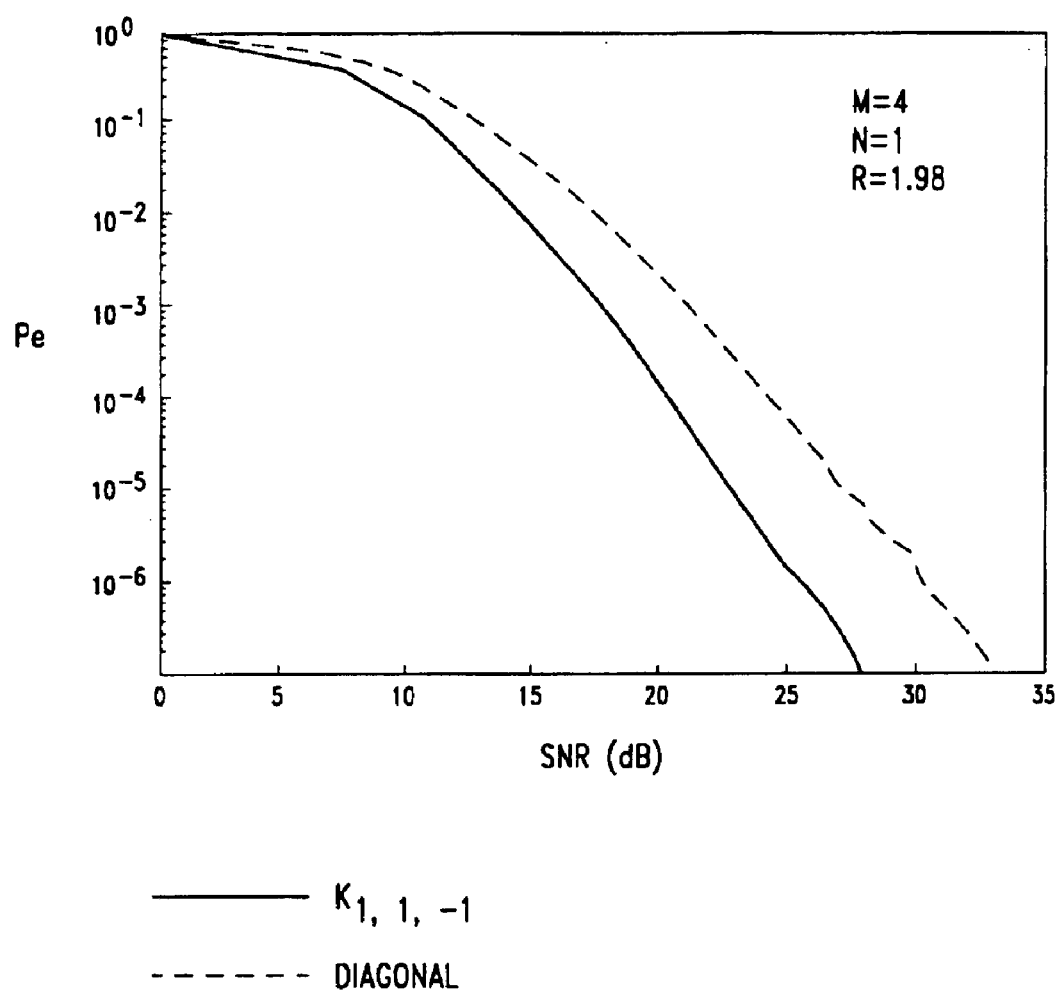
FIG. 7 is a graph of the theoretical block-error rate performance of a signal constellation based on the group $K_{1,1,-1}$ (solid line), which is the binary extension of the group $SL_2(F_5)$ having L=240 unitary matrices (R=1.98). The antenna configuration consists of M=4 transmitter antennas and N=1 receiver antenna. For comparison, we have also represented in the figure the best diagonal (Abelian group) construction found for that antenna configuration and rate (dashed line).

FIG. 7 shows the advantage of $K_{1,1,-1}$ for M=4 transmitter antennas, and compares it with the best Abelian group we found. Again, the performance advantage of this group over the Abelian group is evident.

Table 2 collects together some of the group constellations that we have found with high ζ for different numbers of antennas M and rates R.

TABLE 2

| M | L | R | ζ | Comments |
|---|---|---|---|----------|
| — | 2 | — | 1 | {I, −I} for any M |
| 2 | 24 | 2.29 | 0.5000 | $E_{3,1} = SL_2(F_3)$ |
| 2 | 48 | 2.79 | 0.3868 | $F_{3,1,-1}$ |
| 2 | 120 | 3.45 | 0.3090 | $J_{1,1} = SL_2(F_5)$ |
| 2 | 240 | 3.95 | 0.2257 | $F_{15,1,11}$ |
| 3 | 9 | 1.06 | 0.6004 | Cyclic group $G_{9,1}$ with μ = (1,2,5) |
| 3 | 63 | 1.99 | 0.3851 | $G_{21,4}$ |
| 3 | 513 | 3.00 | 0.1353 | $G_{171,64}$ (t = 19) |
| 3 | 4095 | 4.00 | 0.0361 | $G_{1365,16}$ (t = 91) |
| 3 | 32445 | 5.00 | 0.0131 | $G_{10815,46}$ (t = 721) |
| 4 | 240 | 1.98 | 0.5000 | $K_{1,1,-1}$ |
| 5 | 1025 | 2.00 | 0.1679 | $G_{205,16}$ (t = 41) |
| 5 | 33825 | 3.01 | 0.0501 | $G_{6765,16}$ (t = 451) |
| 5 | 1021025 | 3.99 | 0.0037 | $G_{204205,21}$ (t = 40841) |
| 7 | 16513 | 2.00 | 0.0955 | $G_{2359,8}$ (t = 337) |
| 9 | 513 | 1.00 | 0.361 | $G_{57,4}$ |

Reducible Representations

It should be noted that in at least some cases, signal constellations may be based upon reducible, rather than irreducible, group representations. In particular, given an irreducible representation of a group, consisting of matrices $A_1, \ldots, A_L$, a reducible esentation may be derived therefrom by block diagonal construction. For example, en an invertible, complex linear transformation T of appropriate dimension, a responding reducible representation consists of the matrices $$\begin{bmatrix} A_1 & 0 \\ 0 & TA_1T^{-1} \end{bmatrix}, \ldots, \begin{bmatrix} A_L & 0 \\ 0 & TA_LT^{-1} \end{bmatrix}.$$

A more general construction for deriving a reducible representation of the group is defined in terms of some number m of automorphisms $\phi_i$ of the group, i=1, ..., m. An automorphism is a one-to-one mapping of the group onto itself that preserves the identity element and respects multiplication; i.e., the image of a product of two multiplicative factors under the mapping is the product of the images of the respective factors. According to such a construction, each of the matrices $A_i$ is replaced by an m×m matrix $\tilde{A}_i$ of the form:

$$\tilde{A}_i = \begin{pmatrix} \phi_1(A_i) & 0 & \ldots & 0 \\ 0 & \phi_2(A_i) & \ldots & 0 \\ \vdots & \vdots & \vdots & \vdots \\ 0 & 0 & 0 & \phi_m(A_i) \end{pmatrix}.$$

A construction for deriving a further constellation from any of those described above is defined in terms of arbitrary, but fixed, unitary matrices U and V. Given the constellation of matrices $\tilde{A}_i$, the new constellation consists of the matrices $U\tilde{A}_iV$. It should be noted that the new constellation does not necessarily form a group. Herein, we define the term coset to include any set derived from a group or from a subset of a group by left multiplication, right multiplication, or left and right multiplication. Thus, according to our definition, the constellation consisting of the matrices $U\tilde{A}_iV$ is a coset of the constellation of matrices $\tilde{A}_i$.

Generalization of $G_{m,r}$ to Non-groups

Above, we have explained that for given parameters m and r, the group $G_{m,r}$ has a fixed-point-free representation of dimension n, wherein n is the least integer such that $r^n=1$ mod m. We will now describe a set $S_{m,s}$ that is constructed in a manner similar to $G_{m,r}$ although in general, $S_{m,s}$ is not a group. As will be shown, however, a diversity product ζ can be computed for $S_{m,s}$ from a closed-form expression. Appropriate parameters for $S_{m,s}$ can be chosen that lead to positive $\zeta$. In at least some cases, a set $S_{m,s}$ having positive $\zeta$ will be useful as a signal constellation.

More generally, there will be useful constellations in which, for example, at least half the signal matrices correspond to members of the set $S_{m,s}$ or to members of a coset derived therefrom by left multiplication, right multiplication, or left and right multiplication.

As for the set $G_{m,r}$, the parameter n is equal to the number of transmit antennas. However, in our generalization of the group $G_{m,r}$ to the set $S_{m,s}$, there are no other constraints on possible values for n. Let $\eta = e^{2\pi i/m}$, $\beta = e^{2\pi i/s}$, and let $u_1, \ldots, u_n$ be integers. Then $S_{m,s}$ is defined as the set of n×n matrices of the form $A^l B^k$, wherein $l=0, \ldots, m-1$, $k=0, \ldots, p-1$, p is the lesser of s and n, and the n×n matrices A and B are given by:

$$A = \begin{pmatrix} \eta^{u_1} & 0 & \cdots & 0 \\ 0 & \eta^{u_2} & \cdots & 0 \\ \vdots & \vdots & \ddots & \vdots \\ 0 & 0 & \cdots & \eta^{u_n} \end{pmatrix}, B = \begin{pmatrix} 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \\ \beta & 0 & 0 & \cdots & 0 \end{pmatrix}.$$

The diversity product $\zeta_S$ is given by the following expression:

$$\zeta_s = \frac{1}{2} \min_{\substack{l=0,\ldots,m-1 \\ k=-p+1,\ldots,p-1 \\ (l,k) \neq (0,0)}} \left| \prod_{j=1}^{q} \left(1 - \beta^{\frac{k}{q}} \eta^{l} \sum_{i=0}^{\frac{n}{q}-1} u_{iq+j} \right) \right|^{\frac{1}{n}},$$

wherein q is the greatest common divisor of n and $|k|$.

The number of elements in the set $S_{m,s}$ is $L=mp$. Thus the rate R is given by $$\frac{\log L}{M} = \frac{\log mp}{n}.$$

For any given number M of antennas and any desired rate R, an appropriate constellation is readily designed by setting $M=n$, decomposing L as $L=mp$ with $p \leq n$, and searching over the integers $u_1, \ldots, u_n$, s (wherein $s \leq p$ and for each of the integers $u_i$, $i=1, \ldots, n$, $0 \leq u_i \leq n-1$) to obtain an appropriate resulting value, i.e., a relatively high value, of $\zeta_S$.

Further constellations may be derived from the set $S_{m,s}$ as cosets formed by left multiplication, right multiplication, or both. Further constellations may also be derived as subsets or supersets of the set $S_{m,s}$ or any of its cosets.

Products of Group Representations

In another generalization of group-based constellations, a set $S_{A,B}$ is defined as the set of pairwise products of the elements of two respective, unitary representations of finite fixed-point-free groups $G_A$ and $G_B$. That is, let $V_A = \{A_1, \ldots, A_{L_A}\}$ and $V_B = \{B_1, \ldots, B_{L_B}\}$ be M×M unitary representations of the groups $G_A$ and $G_B$. (We let $A_0$ and $B_0$ represent the identity matrix of appropriate dimension.) The groups $G_A$ and $G_B$ may be chosen from any of the types of non-Abelian (and non-cyclic) fixed-point-free groups that we have described above. Although in general, the set $S_{A,B}$ is not a group, it will in at least some cases be useful as a signal constellation. In this regard, other constellations may be derivable as subsets or supersets of the set $S_{A,B}$ or any of its cosets.

More generally, there will be useful constellations in which, for example, at least half the signal matrices correspond to members of the set $S_{A,B}$ or to members of a coset derived therefrom by left multiplication, right multiplication, or left and right multiplication.

The diversity product $\zeta_S$ of the set $S_{A,B}$ is given by:

$$\zeta_s = \frac{1}{2} \min_{(l,l') \neq (0,0)} |\det(A_l - B_{l'})|^{\frac{1}{M}}.$$

In particular, the respective representations may be equivalent representations of the same group; that is, for some unitary matrix T and for all j, $j=1, \ldots, L_A$, $B=TA_jT^*$. However, we have found that in such a case, the diversity product $\zeta_S$ will be positive only if: (i) the group $G_A$ has an odd number of distinct elements, and (ii) the representation $V_A = \{A_1, \ldots, A_{L_A}\}$ is a reducible representation.

In fact, a set $S_{A,B}$ constructed as above can be useful as a signal constellation even when one or both of the groups $G_A$ and $G_B$ are cyclic groups, although it is desirable in this regard to choose cyclic groups that are fixed-point-free; i.e., that have a positive diversity product. As above, products of equivalent groups according to the construction $B_j = TA_jT^*$ will yield a positive diversity product only if the cyclic group $G_A$ has an odd number of distinct elements and the representation of $G_A$ is reducible. In such a construction, T may be any unitary matrix. (The symbol "*" signifies conjugate transposition.)

A reducible representation of a cyclic group is readily constructed as a set of M×M matrices having the diagonal form:

$$\begin{pmatrix} a_1 & 0 & \cdots & 0 \\ 0 & a_2 & \cdots & 0 \\ \vdots & \vdots & \ddots & \vdots \\ 0 & 0 & \cdots & a_M \end{pmatrix} = \text{diag}(a_1, a_2, \ldots, a_M)$$

Given a desired number M of transmit antennas, M integers $u_1, \ldots, u_M$ are chosen on the closed interval from 1 to $L_A-1$. Given a desired number $L_A$ of elements in the group $G_A$, the parameter $\eta$ is set equal to a primitive $L_A$'th root of unity. (An $L_A$'th root of unity is primitive if $L_A$ is the smallest non-zero power that yields a value of 1 when the root is raised to such power.) Then the elements of the group representation are the diagonal matrices $A_k$, $k=0, \ldots, L_A-1$, given by:

$$A_k = \text{diag}(\eta^{u_1 k}, \eta^{u_2 k}, \ldots, \eta^{u_M k}).$$

It will be understood that $A_0$ is the identity matrix of appropriate dimension, and that for $k>1$, $A_k = (A_1)^k$.

Significantly, we have found that to assure that the cyclic group representation has a positive diversity product, no matrix $A_k$ should have more than half its diagonal elements equal to each other. Moreover, a positive diversity product is guaranteed if $L_A$ is a prime number.

Hamiltonian Constellations

Signal matrices of dimension 2×2 have been proposed for differential modulation in communication systems having precisely two transmit antennas. For example, V. Tarokh et al., "A differential detection scheme for transmit diversity," to appear in *J. Sel. Area. Comm.* (2000), describes a rule for deriving signal matrices for such purpose from a pair of complex parameters x, y of equal absolute value; i.e., $|x|=|y|$.

According to that rule, which we refer to as an orthogonal design, each signal matrix takes the form:

$$OD(x, y) = \frac{1}{\sqrt{2}}\begin{bmatrix} x & -y^* \\ y & x^* \end{bmatrix},$$

wherein the symbol "*" denotes the complex conjugate.

If the parameters x and y have unit absolute value, the matrices are unitary matrices. Thus, for example, a unitary constellation of size $L=Q^2$ is obtained by letting each of x and y range over the Q'th roots of unity; i.e., x, y=1, $e^{1 \cdot 2\pi i/Q}$, $e^{2 \cdot 2\pi i/Q}, \ldots, e^{(Q-1) \cdot 2\pi i/Q}$. The diversity product $\zeta_{OD}$ of such a constellation is given by:

$$\zeta_{OD} = \frac{\sin(\pi/Q)}{\sqrt{2}}.$$

We have discovered that when the values of the parameters x and y are selected appropriately, even better diversity products can be obtained, at least for large constellations, when x and y are permitted to differ in absolute value. This discovery has led us to a new type of constellation, which we refer to as a Hamiltonian constellation, of matrices $$H(x, y) = \begin{bmatrix} x & -y^* \\ y & x^* \end{bmatrix}.$$

If we keep the requirement stated above that the resulting matrices must be unitary, then the real and imaginary parts of x and y are permitted to range over real, four-dimensional Euclidean space, subject to the constraint that $(Re\ x)^2+(Re\ y)^2+(Im\ x)^2+(Im\ y)^2=1$. This is the equation of a three-dimensional spherical surface of unit radius embedded in four-dimensional space, referred to herein as the unit 3-sphere. (Illustratively, an ordinary sphere is a two-dimensional surface embedded in three-dimensional space.)

The diversity product $\zeta_H$ of our Hamiltonian constellation is given by:

$$\zeta_H = \min_{(x,y),(x',y')} \frac{1}{2}\sqrt{|x-x'|^2 + |y-y'|^2}.$$

Significantly, if the pairs (x, y) are viewed as points on the unit 3-sphere, then this diversity product is the ordinary Euclidean distance (in four dimensions) between the most closely spaced pair of such points.

If, by way of illustration, L objects are uniformly distributed within a unit cube (in ordinary three-dimensional space), the separation between neighboring objects will be approximately $L^{-1/3}$. In general, the points of the unit 3-sphere corresponding to a good selection of signal matrices will have approximately uniform spacings between nearest-neighbor pairs. In that way, there will be no particularly small spacings that would otherwise drive down the diversity product. Therefore, by reasoning analogous to that given above for a unit cube, the asymptotic behavior of $\zeta_H$ for large L is $O(L^{-1/3})$. By contrast, the asymptotic behavior of $\zeta_{OD}$ is $O(L^{-1/2})$. As a consequence, large Hamiltonian constellations will generally have a greater diversity product than orthogonally designed constellations of the same size.

As noted, the data transmission rate R for space-time modulation using a constellation of size L is equal to $\log_2 L$, divided by the number of channel uses per signal matrix. Thus, for Hamiltonian constellations, as well as for orthogonally designed constellations, R is equal to ½$\log_2$ L. Given a desired rate R, an appropriate constellation is readily constructed by packing the 3-sphere with the corresponding number L of points, according to a large-minimum-distance packing. Such packings are described, e.g., in J. Hamkins et al., "Asymptotically dense spherical codes," *IEEE Trans. Info. Theory* 43 (1997) 1774–1798, and in J. H. Conway et al., *Sphere Packings, Lattices and Groups*, Springer Verlag (1988). It should be noted that neither Hamiltonian constellations nor orthogonally designed constellations typically form groups. (One notable exception, however, is the group $SL_2F_5$.)

One relatively simple approach to the decoding of Hamiltonian constellations involves selecting a candidate signal matrix having a least Euclidean distance (in the embedding four-dimensional real space) from a receiver estimate of the matrix that was sent. Provided there is good separation between the signal points on the unit 3-sphere, such selection is readily performed by standard techniques such as the bucketing technique described in L. Devroye, *Lecture Notes on Bucket Algorithms*, Birkhäuser, Boston, Mass. (1986). Such an approach is especially useful because the complexity of the bucketing technique is independent of the size of the constellation.

As noted, the matrices of a Hamiltonian constellation as well as those belonging to an orthogonal construction are defined in terms of complex numbers x and y. For Hamiltonian constellations, x and y must satisfy a normalization condition such as $|x|^2+|y|^2=1$. For orthogonal constructions, x and y must have equal absolute values. Clearly, then, a Hamiltonian constellation must be distinct from an orthogonal construction if it contains at least one matrix for which $\||x|-|y|\|$ is greater than zero. Exemplary such constellations will contain at least one matrix for which is $\||x|-|y|\|$ is at least 0.1.

What is claimed is:

1. A method of wireless communication, comprising:
   (a) selecting at least one signal from a constellation of signals, wherein each signal in the constellation corresponds to a unitary matrix of elements arranged in rows and columns;
   (b) in a first time interval, transmitting a respective complex amplitude from each of two or more antennas, wherein said amplitudes are proportional to the respective elements of a row of the matrix corresponding to the selected signal; and
   (c) in at least one further time interval, transmitting a further respective complex amplitude from each of the two or more antennas, wherein said further amplitudes are proportional to the respective elements of a further row of the matrix corresponding to the selected signal;
   wherein the selecting step comprises making a selection from a signal constellation whose corresponding set of unitary matrices comprises at least one of the following:
   (I) a non-Abelian group, other than a quaternion group, having a positive diversity product;
   (II) a subset of a non-Abelian group, other than a guaternion group, having a positive diversity product, and having the further property that the multiplicative closure of said subset is a non-Abelian group having a positive diversity product;
   (III) a coset derived, from a group of the kind characterized in (I), by left multiplication, right multiplication, or left and right multiplication; or
   (IV) a coset derived, from a group subset of the kind characterized in (II), by left multiplication, right multiplication, or left and right multiplication.

2. The method of claim 1, wherein the non-Abelian group belongs to the class $G_{m,r}$, the number of elements in the group is mn, the number of antennas used in the transmitting steps is n, and n is the smallest positive integer greater than 1, such that $r^n = 1 \mod m$, and m and r are selected positive integers which in combination define a particular group belonging to said class.

3. The method of claim 1, wherein the non-Abelian group belongs to the class $D_{m,r,l}$, the number of elements in the group is 2 mn, the number of antennas used in the transmitting steps is 2n, and n is the smallest positive integer such that $r^n = 1 \mod m$, and m, r, and l are selected positive integers which in combination define a particular group belonging to said class.

4. The method of claim 1, wherein the non-Abelian group belongs to the class $E_{m,r}$, the number of elements in the group is 8 mn, the number of antennas used in the transmitting steps is 2n, and n is the smallest positive integer such that $r^n = 1 \mod m$, and m and r are selected positive integers which in combination define a particular group belonging to said class.

5. The method of claim 1, wherein the non-Abelian group belongs to the class $F_{m,r,l}$, the number of elements in the group is 16 mn, the number of antennas used in the transmitting steps is 4n or 2, and n is the smallest positive integer such that $r^n = 1 \mod m$, and m, r, and l are selected positive integers which in combination define a particular group belonging to said class.

6. The method of claim 1, wherein the non-Abelian group belongs to the class $J_{m,r}$, the number of elements in the group is 120 mn, the number of antennas used in the transmitting steps is 2n, and n is the smallest positive integer such that $r^n = 1 \mod m$, and m and r are selected positive integers which in combination define a particular group belonging to said class.

7. The method of claim 1, wherein the non-Abelian group belongs to the class $K_{m,r,l}$, the number of elements in the group is 240 mn, the number of antennas used in the transmitting steps is 4n, and n is the smallest positive integer such that $r^n = 1 \mod m$, and m, r, and l are selected positive integers which in combination define a particular group belonging to said class.

8. A method of wireless communication, comprising:
(a) selecting at least one signal from a constellation of signals, wherein each signal in the constellation corresponds to a unitary matrix of elements arranged in rows and columns;
(b) in a first time interval, transmitting a respective complex amplitude from each of two or more antennas, wherein said amplitudes are proportional to the respective elements of a row of the matrix corresponding to the selected signal; and
(c) in at least one further time interval, transmitting a further respective complex amplitude from each of the two or more antennas, wherein said further amplitudes are proportional to the respective elements of a further row of the matrix corresponding to the selected signal; wherein:
(I) the selecting step comprises making a selection from a signal constellation at least half of which corresponds to a set of unitary matrices that are expressible as matrix products of the form $A^l B^k$, or to a coset derived from such a set of unitary matrices by left multiplication, right multiplication, or left and right multiplication;
(II) A is an n×n diagonal matrix each of whose diagonal elements is an integer power of an m'th root of unity;

(III) B is an n×n diagonal matrix of the form $$\begin{bmatrix} 0 & 1 & \cdots & 0 \\ 0 & 0 & \ddots & \vdots \\ \vdots & \vdots & 0 & 1 \\ e^{2\pi i/s} & 0 & \cdots & 0 \end{bmatrix},$$

in which the upper right corner is the (n−1)×(n−1) unit matrix and $i = \sqrt{-1}$; and (IV) s and m are positive integers, n is a positive integer at least 2, each value of l is a non-negative integer less than m, and each value of k is a non-negative integer less than both s and n.

9. A method of wireless communication, comprising:
(a) selecting at least one signal from a constellation of signals, wherein each signal in the constellation corresponds to a unitary matrix of elements arranged in rows and columns;
(b) in a first time interval, transmitting a respective complex amplitude from each of two or more antennas, wherein said amplitudes are proportional to the respective elements of a row of the matrix corresponding to the selected signal; and
(c) in at least one further time interval, transmitting a further respective complex amplitude from each of the two or more antennas, wherein said further amplitudes are proportional to the respective elements of a further row of the matrix corresponding to the selected signal; wherein:
the selecting step comprises making a selection from a signal constellation at least half of which corresponds to a set of unitary matrices that are expressible as pairwise products of the elements of two respective, unitary representations of finite groups $G_A$ and $G_B$, or to a coset derived from such a set of unitary matrices by left multiplication, right multiplication, or left and right multiplication.

10. The method of claim 9, wherein $G_A$ and $G_B$ are fixed-point-free groups.

11. The method of claim 9, wherein $G_A$ and $G_B$ are the same group, the respective representations are equivalent reducible representations, and the group has an odd number of distinct elements.

12. A method of wireless communication, comprising:
(a) selecting at least one signal from a constellation of signals, wherein each signal in the constellation corresponds to a unitary matrix of elements arranged in rows and columns;
(b) in a first time interval, transmitting a respective complex amplitude from each of two antennas, wherein said amplitudes are proportional to the respective elements of a row of the matrix corresponding to the selected signal; and
(c) in at least one further time interval, transmitting a further respective complex amplitude from each of the two antennas, wherein said further amplitudes are proportional to the respective elements of a further row of the matrix corresponding to the selected signal; wherein:
(I) the selecting step comprises making a selection from a signal constellation at least half of which corresponds to a set of 2×2 unitary matrices of the form $$\begin{bmatrix} x & -y^* \\ y & x^* \end{bmatrix},$$

or to a coset derived from such a set of unitary matrices by left multiplication, right multiplication, or left and right multiplication;

(II) x and y are complex numbers that satisfy the condition $|x|^2+|y|^2=1$; and (m) the set of 2×2 unitary matrices includes at least one matrix for which $\||x|-|y|\|$ is greater than zero.

13. The method of claim 12, wherein the set of 2×2 unitary matrices includes at least one matrix for which $\||x|-|y|\|$ is at least 0.1.

14. A method of wireless communication, comprising:

receiving at least one transmitted signal from two or more transmission antennas, wherein the signal, as transmitted, comprises a respective complex amplitude transmitted from each said transmission antenna in each of two or more respective time intervals; and comparing the received signal to each of a plurality of signals selected from a signal constellation, thereby to identify the received signal with one of the selected signals, wherein the signals of the signal constellation correspond to a set of unitary matrices, and said set comprises at least one of the following:

(I) a non-Abelian group, other than a quaternion group, having a positive diversity product;

(II) a subset of a non-Abelian group, other than a quaternion group, having a positive diversity product, and having the further property that the multiplicative closure of said subset is a non-Abelian group having a positive diversity product;

(III) a coset derived, from a group of the kind characterized in (I), by left multiplication, right multiplication, or left and right multiplication; or (IV) a coset derived, from a group subset of the kind characterized in (II), by left multiplication, right multiplication, or left and right multiplication.

15. The method of claim 14, wherein the non-Abelian group belongs to the class $G_{m,r}$, the number of elements in the group is mn, the number of transmission antennas is n, and n is the smallest positive integer greater than 1, such that $r^n=1$ mod m, and m and r are selected positive integers which in combination define a particular group belonging to said class.

16. The method of claim 14, wherein the non-Abelian group belongs to the class $D_{m,r,l}$, the number of elements in the group is 2 mn, the number of transmission antennas is 2n, and n is the smallest positive integer such that $r^n=1$ mod m, and m, r, and l are selected positive integers which in combination define a particular group belonging to said class.

17. The method of claim 14, wherein the non-Abelian group belongs to the class $E_{m,r}$, the number of elements in the group is 8 mn, the number of transmission antennas is 2n, and n is the smallest positive integer such that $r^n=1$ mod m, and m and r are selected positive integers which in combination define a particular group belonging to said class.

18. The method of claim 14, wherein the non-Abelian group belongs to the class $F_{m,r,l}$, the number of elements in the group is 16 mn, the number of transmission antennas is 4n or 2, and n is the smallest positive integer such that $r^n=1$ mod m, and m, r, and l are selected positive integers which in combination define a particular group belonging to said class.

19. The method of claim 14, wherein the non-Abelian group belongs to the class $J_{m,r}$, the number of elements in the group is 120 mn, the number of transmission antennas is 2n, and n is the smallest positive integer such that $r^n=1$ mod m, and m and r are selected positive integers which in combination define a particular group belonging to said class.

20. The method of claim 14, wherein the non-Abelian group belongs to the class $K_{m,r,l}$, the number of elements in the group is 240 mn, the number of transmission antennas is 4n, and n is the smallest positive integer such that $r^n=1$ mod m, and m, r, and l are selected positive integers which in combination define a particular group belonging to said class.

21. A method of wireless communication, comprising:

receiving at least one transmitted signal from two or more transmission antennas, wherein the signal, as transmitted, comprises a respective complex amplitude transmitted from each said transmission antenna in each of two or more respective time intervals; and comparing the received signal to each of a plurality of signals selected from a signal constellation, thereby to identify the received signal with one of the selected signals, wherein:

(I) at least half the signals of the signal constellation correspond to a set of unitary matrices that are expressible as matrix products of the form $A^l B^k$, or to a coset derived from such a set of unitary matrices by left multiplication, right multiplication, or left and right multiplication;

(II) A is an n×n diagonal matrix each of whose diagonal elements is an integer power of an m'th root of unity;

(III) B is an n×n diagonal matrix of the form $$\begin{bmatrix} 0 & 1 & \cdots & 0 \\ 0 & 0 & \ddots & \vdots \\ \vdots & \vdots & & 0 & 1 \\ e^{2\pi i/s} & 0 & \cdots & 0 \end{bmatrix},$$

in which the upper right corner is the (n−1)×(n−1) unit matrix and $i^2=-1$; and (IV) s and m are positive integers, n is a positive integer at least 2, each value of l is a non-negative integer less than m, and each value of k is a non-negative integer less than both s and n.

22. A method of wireless communication, comprising:

receiving at least one transmitted signal from two or more transmission antennas, wherein the signal, as transmitted, comprises a respective complex amplitude transmitted from each said transmission antenna in each of two or more respective time intervals; and comparing the received signal to each of a plurality of signals selected from a signal constellation, thereby to identify the received signal with one of the selected signals, wherein:

at least half the signals of the signal constellation correspond to a set of unitary matrices that are expressible as pairwise products of the elements of two respective, unitary representations of finite groups $G_A$ and $G_B$, or to a coset derived from such a set of unitary matrices by left multiplication, right multiplication, or left and right multiplication.

23. The method of claim 22, wherein $G_A$ and $G_B$ are fixed-point-free groups.

24. The method of claim 22, wherein $G_A$ and $G_B$ are the same group, the respective representations are equivalent reducible representations, and the group has an odd number of distinct elements.

25. A method of wireless communication, comprising:

receiving at least one transmitted signal from two or more transmission antennas, wherein the signal, as transmitted, comprises a respective complex amplitude transmitted from each said transmission antenna in each of two or more respective time intervals; and comparing the received signal to each of a plurality of signals selected from a signal constellation, thereby to identify the received signal with one of the selected signals, wherein:

(I) at least half the signals of the signal constellation correspond to a set of 2×2 unitary matrices of the form $$\begin{bmatrix} x & -y^* \\ y & x^* \end{bmatrix},$$

or to a coset derived from such a set of unitary matrices by left multiplication, right multiplication, or left and right multiplication;

(II) x and y are complex numbers that satisfy the condition $|x|^2+|y|^2=1$; and (III) the set of 2×2 unitary matrices includes at least one matrix for which $\||x|-|y|\|$ is greater than zero.

26. The method of claim 25, wherein the set of 2×2 unitary matrices includes at least one matrix for which $\||x|-|y|\|$ is at least 0.1.

* * * * *